(12) United States Patent
Key et al.

(10) Patent No.: US 11,199,437 B2
(45) Date of Patent: Dec. 14, 2021

(54) UTILIZATION OF FAST-RESPONSE PRESSURE MEASUREMENTS TO NONINTRUSIVELY MONITOR BLADE VIBRATION IN AXIAL COMPRESSORS

(71) Applicant: Purdue Research Foundation, West Lafayette, IN (US)

(72) Inventors: Nicole Leanne Key, West Lafayette, IN (US); Yujun Leng, West Lafayette, IN (US); Nicholas Joseph Kormanik, III, West Lafayette, IN (US); Fangyuan Lou, West Lafayette, IN (US); Douglas Ryan Matthews, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 119 days.

(21) Appl. No.: 16/843,965

(22) Filed: Apr. 9, 2020

(65) Prior Publication Data
US 2020/0333178 A1 Oct. 22, 2020

Related U.S. Application Data

(60) Provisional application No. 62/836,346, filed on Apr. 19, 2019, provisional application No. 62/866,084, filed on Jun. 25, 2019.

(51) Int. Cl.
*G01H 5/00* (2006.01)
*F01D 21/00* (2006.01)
(Continued)

(52) U.S. Cl.
CPC .............. *G01H 3/08* (2013.01); *F01D 17/08* (2013.01); *F01D 21/003* (2013.01); *G01H 1/003* (2013.01);
(Continued)

(58) Field of Classification Search
CPC ........ F01D 17/08; F01D 21/003; F01D 21/14; F01D 5/26; F05D 2260/80;
(Continued)

(56) References Cited

U.S. PATENT DOCUMENTS 3,194,487 A * 7/1965 Tyler ...................... F02C 7/045
                                                                415/1
4,967,550 A * 11/1990 Acton ...................... F01D 25/06
                                                                415/119
(Continued)

FOREIGN PATENT DOCUMENTS

RU           2538427 C1 *  1/2015

OTHER PUBLICATIONS

Jha et al., Development of Instrumentation to Capture Unsteady & Flutter Phenomena in the Fan Rotors of Gas Turbine Engines, 2011 IEEE International Instrumentation and Measurement Technology Conference (Year: 2011).*

(Continued)

*Primary Examiner* — David L Singer
(74) *Attorney, Agent, or Firm* — Purdue Research Foundation

(57) ABSTRACT

A method to monitor rotor blade vibration using unsteady casing pressure. The method applies a non-intrusive blade vibration monitoring technique by using an array of unsteady pressure sensors which may be flush-mounted in the casing of a compressor. The method comprises using spinning mode theory and temporal-spatial analysis to obtain frequency and nodal diameter information of spinning pressure waves associated with the rotor blade vibration. An example of the compressor can be a multistage axial compressor.

11 Claims, 11 Drawing Sheets

(51) Int. Cl.
  *G01H 1/00* (2006.01)
  *G01H 3/08* (2006.01)
  *F01D 17/08* (2006.01)
  *F01D 5/26* (2006.01)
  *F01D 21/14* (2006.01)

(52) U.S. Cl.
  CPC .................. *G01H 5/00* (2013.01); *F01D 5/26* (2013.01); *F01D 21/14* (2013.01); *F05D 2260/80* (2013.01); *F05D 2260/96* (2013.01); *F05D 2270/301* (2013.01); *F05D 2270/334* (2013.01)

(58) Field of Classification Search
  CPC ........... F05D 2260/96; F05D 2270/301; F05D 2270/334; G01H 1/003; G01H 3/08; G01H 5/00
  See application file for complete search history.

(56) References Cited

U.S. PATENT DOCUMENTS

| | | | | |
|---|---|---|---|---|
| 5,005,353 | A * | 4/1991 | Acton | F01D 17/02 60/39.281 |
| 5,082,421 | A * | 1/1992 | Acton | F01D 17/02 415/118 |
| 5,141,391 | A * | 8/1992 | Acton | F01D 17/02 415/119 |
| 5,478,199 | A * | 12/1995 | Gliebe | F02C 7/045 415/119 |
| 5,479,818 | A * | 1/1996 | Walter | F04D 27/02 73/112.05 |
| 5,541,857 | A * | 7/1996 | Walter | G01H 1/006 415/26 |
| 5,984,625 | A * | 11/1999 | Murray | F04D 27/02 415/1 |
| 6,755,617 | B2 * | 6/2004 | Escuret | F04D 27/0207 700/170 |
| 7,082,371 | B2 | 7/2006 | Griffin et al. | |
| 2008/0181769 | A1 * | 7/2008 | Wilson | F01D 5/141 415/181 |
| 2018/0142891 | A1 * | 5/2018 | Rouwenhorst | F23N 5/16 |

OTHER PUBLICATIONS

Mathioudakis et al., Fast Response Wall Pressure Measurement as a Means of Gas Turbine Blade Fault Identification, Journal of Engineering for Gas Turbines and Power Apr. 1991, vol. 113 (Year: 1991).*

Courtiade et al., Modal Decomposition for the Analysis of the Rotor-stator Interactions in Multistage Compressors, Journal of Thermal Science vol. 21, No. 3 (2012) 276-285 (Year: 2012).*

Hoss et al., Experimental Setup, Measurement and Analysis of the Onset of Compressor Flow Instabilities in an Aeroengine, ICIASF'97 Record. International Congress on Instrumentation in Aerospace Simulation Facilities (Year: 1997).*

Forbes G. et al., Simulation of gas turbine blade vibration measurement from unsteady casing wall pressure. Proceedings of ACOUSTICS 2009.

Silkowski P. A et al., Coupled Mode Analysis of Unsteady Multistage Flows in Turbomachinery. United States: N. p., 1998 Web. doi: 10.1115/1.2841732.

Feiner D. et al., A Fundamental Model of Mistuning for a Single Family of Modes. Journal of Turbomachinery. Oct. 2002, vol. 124, 597.

* cited by examiner

UTILIZATION OF FAST-RESPONSE PRESSURE MEASUREMENTS TO NONINTRUSIVELY MONITOR BLADE VIBRATION IN AXIAL COMPRESSORS

CROSS-REFERENCE TO RELATED APPLICATION

This application claims the benefits of U.S. Provisional Application Ser. No. 62/866,084 filed Jun. 25, 2019, and 62/836,346 filed Apr. 19, 2019, the contents of which are incorporated herein entirely.

TECHNICAL FIELD

The present disclosure relates to a novel method to monitor rotor blade vibration using unsteady casing pressure. The novel method applies a non-intrusive blade vibration monitoring technique by using an array of unsteady pressure sensors flush-mounted in the casing of a multistage axial compressor.

BACKGROUND

This section introduces aspects that may help facilitate a better understanding of the disclosure. Accordingly, these statements are to be read in this light and are not to be understood as admissions about what is or is not prior art.

Rotor blade vibration due to forced response is a major cause of High Cycle Fatigue. Much effort has been devoted to measure and monitor blade vibration. The most established method utilizes strain gages, which continuously measure the vibrating strain at critical positions of a blade and can be converted to alternating stress through an FEA model. However, the applied strain gages and associated wires can change the blade structural dynamic properties. In addition, this requires the use of a slip ring or telemetry system, which greatly increases the system complexity and cost, while still enduring a significant sensor failure rate. Strain gages are, thus, not ideal for vibration monitoring in engines. In recent years, nonintrusive stress measurement systems (NSMS), or blade tip timing systems, have become more popular. NSMS systems use multiple probes to calculate the blade deflection amplitude by comparing the actual blade arrival time with the expected blade arrival time. Some disadvantages to using NSMS systems for vibration monitoring is that the blade vibration information is significantly under sampled, giving only discrete blade passing information, and it requires pre-knowledge of the blade vibration mode and significant post-processing to obtain accurate blade deflection information. In addition, the NSMS probes must be placed in precise locations to capture the vibrational mode of interest, and the vibrational mode shape must have sufficient tip deflection to be detectable by the flush-mounted NSMS probes in the casing.

Unsteady pressure transducers have been used to study the pressure waves related to blade vibration and compared to strain gage data. For non-synchronous blade vibration, Schoenenborn and Breuer showed that casing-mounted fast-response pressure transducers over the rotor blade can qualitatively capture the unsteady pressure features related to different types of blade vibration at the inception and during the reversed-flow phase of compressor surge. See Schoenenborn, H. and Breuer, T., "Aeroelasticity at Reversed Flow Conditions—Part II: Application to Compressor Surge", ASME. J. Turbomach. 134(6), 061031, 2012. Leichtfulß et al. measured casing unsteady pressures during blade vibrations due to flutter and rotating stall. See Leichtfulß et al., "Aeroelastic Investigation of a Transonic Research Compressor", ASME. Turbo Expo: Power for Land, Sea, and Air, Volume 7B: Structures and Dynamics GT2013-94730, 2013. The spectral analysis of the unsteady pressure showed the characteristic frequency of the blade vibration. However, both studies were limited to a qualitative characterization of blade vibration related to the unsteady pressure features. To measure blade deflection, Kurkov used casing unsteady pressure to extract the blade passing signal feature and use it to determine blade tip arrival time for each blade. See Kurkov, A. P. et a al, "Flutter Spectral Measurements Using Stationary Pressure Transducers", ASME. J. Eng. Power. 103(2):461-467, 1981. The blade deflection was calculated using a similar algorithm as employed in the NSMS blade tip timing method, but the success of this method was limited to non-synchronous vibration due to flutter because of the low signal-to-noise ratio.

For synchronous blade vibration due to forced response, Anderson et al. used a microphone array to detect the acoustic signature of blade vibration. A vibrating rotor blade acts as a series of rotating dipoles. See Anderson, J. M. et al., "Acoustic Monitoring of Axial Compressor Rotor Blade Vibrations", 12th AIAA/CEAS Aeroacoustics Conference (27th AIAA Aeroacoustics Conference. Cambridge, Mass., 2006. With 5 microphone signals, the sum-and-delay technique was used to calculate the steered array power of the rotating dipoles due to blade vibration. However, the long tube connecting the casing static tap to the microphone demanded significant calibration. In addition, flow turbulence lead to incoherence in the microphone measurements, which causes a large discrepancy between steered array power and strain gage signal at certain frequencies. Unsteady pressure loading on the stator downstream of the vibrating rotor has also been used to detect blade vibration. Both frequency domain and cross-covariance methods were used to detect the blade resonant vibration. Results were promising when compared to NSMS data. See Murray, W. L. and Key, N. L. (2015), "Detection of Rotor Forced Response Vibrations Using Stationary Pressure Transducers in a Multistage Axial Compressor," International Journal of Rotating Machinery, vol. 2015. However, the method required the installation of unsteady pressure transducers on stator blade and thus, is not suitable for nonintrusive blade vibration monitoring.

Generally speaking, unsteady pressure due to non-synchronous vibration (e.g. caused by flutter, rotating stall and surge) is easier to extract than unsteady pressure due to synchronous vibration (e.g. caused by forced response). Blade vibrations due to flutter, surge and stall usually have higher vibration amplitudes and, thus, generate stronger unsteady pressure waves than blade vibrations due to forced response. Additionally, the non-engine order characteristic frequency of the non-synchronous vibration renders the spectral analysis a very effective filter of the unsteady pressure waves due to the rotor potential field and rotor-stator interaction, which occur at different integer multiples of engine order frequencies. On the other hand, the primary pressure wave due to forced response blade vibration has zero frequency in the stationary reference frame. The scattered pressure waves due to forced response blade vibration occur at blade passing frequency (BPF) and multiple of BPF, which are buried in the significant 'noise' due to the rotor potential field occurring at the same frequencies.

Therefore, novel non-intrusive methods to monitor rotor blade vibration using unsteady casing pressure are still needed.

SUMMARY

The present disclosure relates to a novel method to monitor rotor blade vibration using unsteady casing pressure.

In one embodiment, the present disclosure provides a method to detect compressor rotor blade vibration, wherein the method comprises using spinning mode theory to obtain frequency and nodal diameter information for all pressure waves that can be identified and determining any of the pressure waves that is associated with blade vibration.

DETAILED DESCRIPTION

Figure 1:
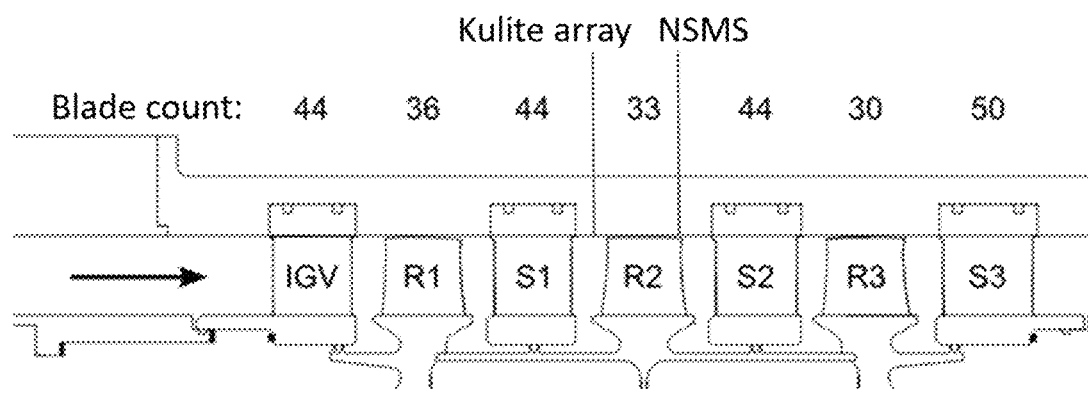
FIG. 1 illustrates a cross-section of the flow path with blade count and axial positions of unsteady pressure sensors array and NSMS probes.

For the purposes of promoting an understanding of the principles of the present disclosure, reference will now be made to embodiments illustrated in drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

A novel non-intrusive method as disclosed herein has been developed to monitor rotor blade vibration using unsteady casing pressure. Rotor forced response vibration is a leading cause of pre-mature blade failure. Traditional methods for monitoring blade vibration, such as strain gages and blade tip timing (BTT), feature high implementation cost. The present blade vibration monitoring technique utilizes casing unsteady pressure sensors that can detect the pressure waves associated with blade vibration. Spinning mode theory was used to identify the specific frequencies and Nodal Diameters (ND) of the spinning pressure waves associated with the blade vibration. A dual temporal-spatial analysis method has been developed to extract the specific frequency components using Fourier Transforms, and the specific ND component was extracted using a circumferential mode-fitting algorithm. An experimental study was done in the Purdue 3-Stage axial research compressor to verify the new rotor blade vibration monitoring method against the BTT method. During the experiment, the compressor was swept through the resonant crossing speed corresponding to the 1st Torsion (1T) vibratory mode of the embedded rotor, while the unsteady casing pressure data and BTT data were simultaneously acquired. Utilizing as few as two sensors, the pressure wave due to blade forced vibration was extracted. A constant scaling factor between the resultant pressure wave strength and blade deflection amplitude occurred for two different loading conditions. The close match between blade vibration-generated pressure wave strength and blade deflection amplitude through the resonant range provides the validation for the new rotor blade vibration monitoring method. This appears to be the first time that blade vibration-related pressure waves have been extracted from casing pressure sensor arrays and used to quantify blade vibration.

In this disclosure, a novel blade vibration monitoring method is developed to measure the pressure waves due to forced response blade vibration using a circumferential array of pressure transducers flush-mounted in the casing. Since the flow in the compressor is highly unsteady, there are a lot of unsteady pressure waves generated from difference sources. The difficulty is in the post-processing technique required to detect the relatively weak pressure waves generated during blade vibration (compared to those generated by aerodynamic blade row interactions).

According to spinning mode theory, the complicated flow field inside multistage compressors can be represented by a couple of spinning modes (each containing corresponding vorticity, pressure, and entropy waves) of unique combinations of frequency and circumferential wave number (In this disclosure, nodal diameter is used for circumferential wave number to match the nomenclature utilized in Silkowski, P. D. and Hall, K. C., (1997), "A Coupled Mode Analysis of Unsteady Multistage Flows in Turbomachinery". ASME. Turbo Expo: Power for Land, Sea, and Air, Volume 4). The pioneering work in spinning modes studied the discrete frequency noise in axial flow compressor. Through combined analytical and experimental research, Taylor and Sofrin derived the spatial and spectral properties of the acoustic wave associated with stator-rotor interactions, known as the Taylor-Sofrin mode. See Tyler, J. and Sofrin, T., (1962) "Axial Flow Compressor Noise Studies", SAE Technical Paper 620532. Based on the spinning mode theory, harmonic balance methods have been developed to efficiently run unsteady CFD cases. Using only a few harmonics, the harmonic balance method results can closely match the full scale time domain unsteady CFD results. This suggests that, indeed, the unsteady flow field can be represented by a limited number of spinning modes.

In this disclosure, the experimental facility and methods are introduced first. The physical processes behind stator-rotor interaction, rotor blade vibration, and their generated unsteady pressure waves are then presented using spinning mode theory. Next, a dual temporal-spatial analysis technique is developed to separate blade vibration-related spinning modes from the other spinning modes detected with the casing unsteady pressure sensors. The pressure waves due to blade vibration are then post-processed by proper low-pass filtering and zeroing and compared with the simultaneously acquired NSMS blade deflection data. In the end, a semi-analytical analysis is presented to support the linearized analysis assumption used in the data processing procedures.

In one embodiment, the present disclosure provides a method to detect compressor rotor blade vibration, wherein the method comprises using spinning mode theory to obtain frequency and nodal diameter information for all pressure waves that can be identified and determining any of the pressure waves that is associated with blade vibration.

In one embodiment regarding the method, the method further comprises using an analytical method to estimate axial decay rates of each said pressure waves that is associated with blade vibration.

In one embodiment regarding the method, the method further comprises a step to determine whether a pressure wave is cut-on or cut-off, wherein only cut-on or near cut-on pressure waves with low decay rates are analyzed.

In one embodiment regarding the method, wherein a plurality of unsteady pressure sensors are used, wherein the number of unsteady pressure sensors is equal or more than the number of spinning modes of interest.

In one embodiment regarding the method, wherein optimized circumferential locations of the unsteady pressure sensors array are calculated by minimizing the condition number of fitting matrix A, wherein the fitting matrix A and its condition number are defined by:

$$\text{cond}(A) = \|A\| \|A^+\|$$

wherein $A^+$ is the Moore-Penrose pseudoinverse of A, $\| \ \|$ is the two norm of the matrix A, and $$A = \begin{bmatrix} e^{i(ND_1 \cdot \theta_1)} & e^{i(ND_2 \cdot \theta_1)} & \ldots & e^{i(ND_n \cdot \theta_1)} \\ e^{i(ND_1 \cdot \theta_2)} & e^{i(ND_2 \cdot \theta_2)} & \ldots & e^{i(ND_n \cdot \theta_2)} \\ \vdots & \vdots & \vdots & \vdots \\ \vdots & \vdots & \vdots & \vdots \\ e^{i(ND_1 \cdot \theta_m)} & e^{i(ND_2 \cdot \theta_m)} & \ldots & e^{i(ND_n \cdot \theta_m)} \end{bmatrix}.$$

In one embodiment regarding the method, wherein unsteady pressure signals are simultaneously sampled from each unsteady pressure sensor.

In one embodiment regarding the method, wherein the method further comprises extracting each pressure wave strength from the unsteady pressure sensor array data with dual temporal-spatial analysis method.

In one embodiment regarding the method, wherein the method further comprises first extracting specific frequency components using Fourier Transform method, and then extracting specific Nodal diameter components from the frequency components with a circumferential mode-fitting algorithm.

In one embodiment regarding the method, wherein the circumferential mode-fitting algorithm is formulated with:

$$\begin{bmatrix} e^{i(ND_1 \cdot \theta_1)} & e^{i(ND_2 \cdot \theta_1)} & \ldots & e^{i(ND_n \cdot \theta_1)} \\ e^{i(ND_1 \cdot \theta_2)} & e^{i(ND_2 \cdot \theta_2)} & \ldots & e^{i(ND_n \cdot \theta_2)} \\ \vdots & \vdots & \vdots & \vdots \\ \vdots & \vdots & \vdots & \vdots \\ e^{i(ND_1 \cdot \theta_m)} & e^{i(ND_2 \cdot \theta_m)} & \ldots & e^{i(ND_n \cdot \theta_m)} \end{bmatrix} \begin{Bmatrix} y_1 \\ y_2 \\ \vdots \\ y_n \end{Bmatrix} = \begin{Bmatrix} x_1 \\ x_2 \\ \vdots \\ \vdots \\ x_m \end{Bmatrix},$$

wherein $y_i$ is the complex strength of the $i^{th}$ spinning mode with $ND_i$, $x_j$ is the complex strength of the specified frequency component at the $j^{th}$ sensor. $\theta_j$ is the angular position of the $j^{th}$ sensor in radians.

In one embodiment regarding the method, wherein the method further comprises isolating pressure waves associated with blade vibration.

In one embodiment regarding the method, wherein the isolation of the pressure waves associated with blade vibration is achieved with a polynomial fitting method to zero the slowly changing background due to the wake/potential field rotor interaction.

Experimental Facility

The experimental study was conducted in the Purdue Three-Stage Research Compressor. It is a scaled-up version of the rear stages of a modern high-pressure compressor, with engine-relevant Mach number and Reynolds numbers. The compressor consists of an inlet guide vane (IGV) row and three rotor-stator stages, as shown in FIG. 1.

Figure 2:
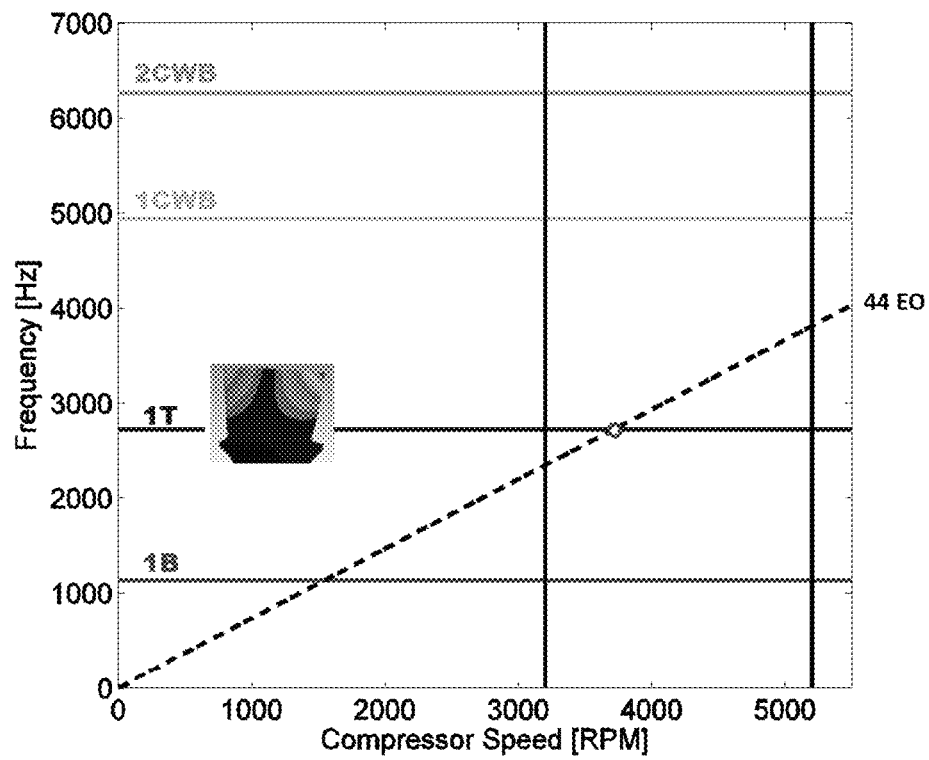
FIG. 2 illustrates a Rotor 2 Campell Diagram with 44EO 1T crossing.

During the experiment, the compressor was decelerated through the Rotor 2 (R2) 1st Torsion vibrational mode (1T) resonant speed, while the casing unsteady pressure data and NSMS data were simultaneously acquired. The R2 Campbell diagram with resonant crossing of the 1T mode excited by the adjacent 44 vanes Stator 1 (S1) and Stator 2 (S2) is shown in FIG. 2. The natural frequency of the R2 1T mode is 2724 Hz, and the corresponding 44EO crossing occurs around 3714 rpm. The experiments were conducted at both nominal loading (NL) and high loading (HL) conditions, as defined in Murray, W. L., and acquired twice to verify repeatability. See Murray, W. L. and Key, N. L., (2015), "Detection of Rotor Forced Response Vibrations Using Stationary Pressure Transducers in a Multistage Axial Compressor," International Journal of Rotating Machinery, vol. 2015.

The casing unsteady pressure data were acquired using 3 subminiature Kulite transducers (XTL-140), located about halfway between R2 leading edge (LE) and S1 trailing edge (TE) axially, and 95, 150, 220 degrees circumferentially. The 3 unsteady pressure signals were simultaneously acquired at 100 kHz for rotor sweeps from 3600 rpm to 3800 rpm at a rate of 3.0 rpm/s. A Precision Filter 28000 chassis with a Model 28118 card was used for the excitation and signal conditioning of the Kulite sensors. An NI PXIe-1073 chassis with PXIe-6358 cards were used for digital data acquisition. Also, the R2 trailing edge blade tip deflection data were acquired with an 8-probe Agilis NSMS system.

Physical Process

The multistage compressor pressure field is very noisy from a combination of broadband noise associated with turbulence in addition to significant discrete frequency tones associated with stator-rotor interactions. When a blade row passes through the wakes and potential field of the adjacent blade rows, the non-uniform flow field causes unsteady loading on the blades and generates pressure waves. The pressure waves travel upstream and downstream interacting with, and being scattered and reflected from neighboring blade rows. In addition, the potential fields of the rotating rotors also cause unsteady pressures in the stationary reference frame. Thus, it is a difficult task to detect the pressure wave due to blade vibration among such a complicated unsteady pressure field inside a multistage compressor.

An analysis based on the spinning modes concept was used to understand the physical processes of stator-rotor interaction, blade vibration, and their associated pressure waves. According to spinning mode theory, the blade rows are coupled together by the unsteady waves between them. When an unsteady wave impinges on a blade row, it will be scattered into an infinite number of unsteady waves with the same frequency but different nodal diameter. When an unsteady wave travels from one blade row to another, its frequency is shifted when viewed in the reference frame of the new blade row due to the Doppler effect.

Figure 3:
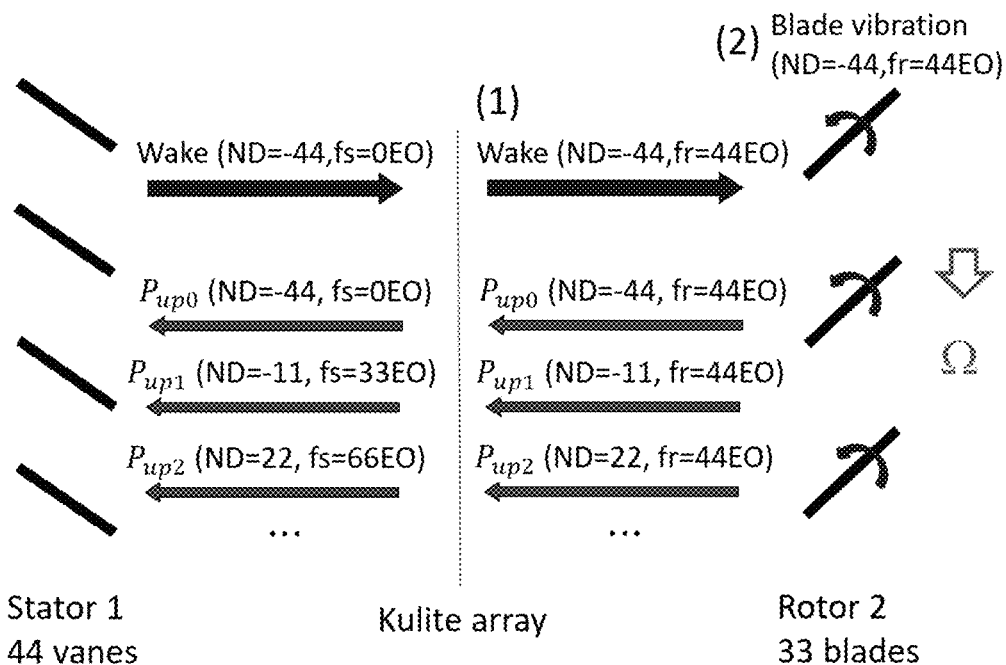
FIG. 3 illustrates a schematic of the upstream going pressure waves generation when compressor sweeps through Rotor2 resonant crossing.

Consider the case of the R2 blade vibration excited by the upstream Stator 1 wake. The schematic in FIG. 3 illustrates two major physical processes when the upstream-going pressure waves were generated due to R2 forced response vibrations: (1) pressure waves due to S1-wake-R2-blade interaction and (2) pressure waves due to R2 blade vibration. The frequency in the rotor reference frame is labeled as "fr", and the frequency in stator reference frame is "fs".

When the rotor operates at a speed far from the resonant crossing, the rotor blades are moving in solid body rotation without vibration. The S1 wakes interacting with the rotating R2 blades generate pressure waves traveling both upstream and downstream. The S1 wake has 0 frequency in the stator reference frame, but it has a 44 Engine Order (EO) excitation in the rotor reference frame. Actually, the nodal diameter is −44 since the S1 wake appears to be rotating in the opposite direction in the rotor reference frame. The primary pressure wave generated by the S1 wakes interacting with the R2 blades, $p_{up0}$, has the same ND and frequency as the S1 wakes. The resulting scattered pressure waves have the same frequency as the S1 wakes in the rotor reference frame, but their nodal diameters become −11 (−44+1×33) and 22 (−44+2×33) for the $1^{st}$ and $2^{nd}$ scattered pressure wave, $P_{up1}$ and $p_{up2}$, respectively. When these pressure waves are measured in the stator reference frame, their nodal diameters are unchanged, but their frequencies are shifted to 0EO, 33EO and 66EO for the primary, $1^{st}$ and $2^{nd}$ scattered pressure waves, respectively. (The general formula for the spinning mode frequency and ND is given in the next section.).

When the rotor speed reaches the R2 resonant speed, the blades start to vibrate. The vibrating blade surface acts as a line of dipole sources that generate pressure waves, which travel both upstream and downstream. The R2 blade vibration shares the same nodal diameter and frequency as the S1 wakes since it is a forced-response vibration driven by the S1 wakes (known as synchronous vibration). Thus, the primary and scattered pressure waves generated by the R2 blade vibration have the same nodal diameters and frequency as the corresponding pressure waves generated by S1-wake-R2-blade interaction. Even during R2 resonant vibration, the S1 wake still impinges on the R2 blades. However, since the blade deflection amplitude (max deflection is less than 24 thousandths of an inch at the high loading condition) is much smaller than the blade geometry and wake structure, the it can be assumed that the blade is not vibrating for consideration of the unsteady pressure waves generated by S1-wake-R2-blade interaction. Thus, the two processes can be treated separately for a linearized analysis. The pressure waves measured by the array are, thus, the summation of the two effects.

In addition, the rotating R2 potential field also causes unsteady pressure detected by the pressure sensor array. The R2 potential field has 0 frequency in the rotor reference frame, but it has BPF and harmonics of BPFs in the stator reference frame. The discussion here focuses on the major pressure waves detected at this location. There are additional minor reflected and scattered pressure waves from both upstream and downstream blade rows, pressure waves due to the S2 potential field and R2 blade interaction, and pressure waves due to stator-rotor interaction other than S1-R2-S2. However, these pressure waves are much weaker than the major pressure waves discussed above.

Spinning Modes

The unsteady waves can be categorized as spinning modes according to their frequency and nodal diameter. For the general case with m blade rows, define the $i^{th}$ row as stators and $j^{th}$ row as rotors, where i is odd and j is even, and each blade row has $B_i$ blades. If the initial excitation occurring in the rotor has a nodal diameter $n_0$ and frequency $\omega_0$, the general formula for the nodal diameter (ND) and frequency in the stator ($\omega_{stator}$) and rotor ($\omega_{rotor}$) reference frames are:

$$ND = n_0 + n_1 B_1 + n_2 B_2 + n_3 B_3 + \ldots n_m B_m \quad (1)$$

$$\omega_{rotor} = \omega_0 - ( \ldots + n_{i-2} B_{i-2} + n_i B_i + n_{i+2} B_{i+2}) \Omega \quad (2)$$

$$\omega_{stator} = \omega_0 + (n_0 + \ldots + n_{j-2} B_{j-2} + n_j B_j + n_{j+2} B_{j+2}) \Omega \quad (3)$$

where $n_i$ are integer scattering indices, and $\Omega$ is rotational speed

From the general formula, the characteristic frequency and nodal diameter of a specific spinning mode are determined by the combination of scattering indices. For the R2 1T forced response case studied here, the excitation sources are the wake and potential field of the stator rows themselves. Since the rotor blade vibration is a synchronized vibration, there is no external initial excitation, and thus, both $n_0$ and $\omega_0$ are equal to zero. Based on a 3-row S1(44 vanes)-R2(33 blades)-S2(44 vanes) analysis with scattering indices from −1 to 1 for the stator rows and −2 to 2 for the rotor row, the properties of possible spinning modes are calculated using Eqs. (1)-(3) and listed in Table 1. Since S1and S2 have the same vane count, they can be treated as a single row when considering the kinematics of the spinning modes.

TABLE 1

Spinning mode table based on S1-R2-S2

| Mode # | $n_1$ S1/S2 | $n_2$ R2 | ND | $f_{stator}$ EO | $f_{rotor}$ EO | Exponential decay rate [per inch] |
|---|---|---|---|---|---|---|
| 1 | −1 | −2 | −110 | −66 | 44 | −9.27 |
| 2 | 0 | −2 | −66 | −66 | 0 | −5.45 |
| 3 | 1 | −2 | −22 | −66 | −44 | −0.77 |
| 4 | −1 | −1 | −77 | −33 | 44 | −6.50 |
| 5 | 0 | −1 | −33 | −33 | 0 | −2.73 |

TABLE 1-continued

Spinning mode table based on S1-R2-S2

| Mode # | $n_1$ S1/S2 | $n_2$ R2 | ND | $f_{stator}$ EO | $f_{rotor}$ EO | Exponential decay rate [per inch] |
|---|---|---|---|---|---|---|
| 6 | 1 | −1 | 11 | −33 | −44 | 0.00 |
| 7 | −1 | 0 | −44 | 0 | 44 | −3.68 |
| 8 | 0 | 0 | 0 | 0 | 0 | 0.00 |
| 9 | 1 | 0 | 44 | 0 | −44 | −3.68 |
| 10 | −1 | 1 | −11 | 33 | 44 | 0.00 |
| 11 | 0 | 1 | 33 | 33 | 0 | −2.73 |
| 12 | 1 | 1 | 77 | 33 | −44 | −6.50 |
| 13 | −1 | 2 | 22 | 66 | 44 | −0.77 |
| 14 | 0 | 2 | 66 | 66 | 0 | −5.45 |
| 15 | 1 | 2 | 110 | 66 | −44 | −9.27 |

The spinning mode related to the blade vibration due to S1 wake excitation is characterized with $n_1$ of −1. It is negative because the S1wake is rotating backward in the rotor reference frame. Mode1 [$n_1$=−1, $n_2$=0] corresponds to the primary unsteady wave generated by R2 blade vibration. Based on Eq. (1), the nodal diameter ND=−1×44+0×33=−44. Based on Eq. (2), the frequency in rotor reference frame $\omega_{rotor}$=−(−1×44)Ω=44Ω. Based on Eq. (2), the frequency in stator reference frame $\omega_{rotor}$=(0×33)Ω=0Ω. This mode has a 44EO frequency in the rotor reference frame and 0 frequency in the stator reference frame because its forcing function (the S1wake) is stationary in the stator reference frame. Thus, although it is the primary unsteady wave due to R2 blade vibration, it cannot be detected by the stationary casing pressure sensor array.

Fortunately, the first R2-scattered unsteady pressure wave (due to R2 blade vibration excited by the S1 wake) is Mode10 [$n_1$=−1, $n_2$=1] and has a 33EO frequency in the stator reference frame, which can be measured by the stationary casing pressure sensor array. However, Mode10, 11 and 12 all have 33EO in the stator reference frame. Mode11 [$n_1$=0, $n_2$=1] corresponds to the rotor potential field, which has 0 frequency in rotor reference frame but has 33EO frequency in the stator reference frame. It provides a significant 33EO signal due to the close proximity between R2 LE and the casing pressure array. This is the major noise that needs to be filtered out when looking for the pressure wave associated with blade vibration. The other 33EO mode, Mode12 [$n_1$=1, $n_2$=1], corresponds to a S1 scattered unsteady wave due to the interaction of the R2 potential field ($n_2$=1) with S1. It also has a 33EO frequency in the stator reference frame and introduces additional noise.

Similarly, the second R2-scattered unsteady pressure wave, Mode13 [$n_1$=−1, $n_2$=2], has a 66EO frequency in the stator reference frame and can be detected by the pressure sensor array. The noise in the 66EO frequency component includes the second harmonic of the R2 potential field (Mode14) and the S1-scattered unsteady wave due to S1interaction with the second harmonic of the R2 potential field (Mode15).

To separate the blade vibration related Mode10 from the R2 potential field effect related to Mode11 and Mode12 (or to separate Mode13 from Mode14 and Mode15 for the 66EO component), the circumferential pressure sensor array can be used to decompose these spinning modes according to their unique nodal diameters.

Also, the pressure waves in Table 1 are not equally presented in compressor. Based on a linearized two-dimensional analysis (see Smith, S. N "Discrete Frequency Sound Generation in Axial Flow Turbomachines", H,M Stationery office: Richmond UK, 1973; Volume 3709, pp. 1-59), the unsteady pressure wave can be written as $p=\bar{p}e^{i(\omega t+k_y y)}=[\bar{p}e^{i(\omega t+k_y y)}e^{i(Re(k_x)x)}]e^{-Im(k_x)x}$, where T) is the pressure wave amplitude, $k_x$ and $k_y$ are the axial and circumferential wave number, respectively. Thus, the imaginary part of the axial wavenumber is the exponential decay rate of the pressure wave in the axial direction. When $Im(k_x)$ is zero, the pressure wave propagates axially and is known as a cut-on mode. When $Im(k_x)$ is non-zero, the pressure wave decays and is known as a cut-off mode (as defined in Tyler, J. and Sofrin, T., (1962) "Axial Flow Compressor Noise Studies", SAE Technical Paper 620532). In practice, only the spinning pressure waves with a low decay rate (more cut-on) can reach the pressure sensor measurement position with sufficient strength to be detected. The cut-off pressure waves with large decay rates can be neglected. The exponential decay rate of each spinning mode is listed in Table 1, calculated using Equation (11) in Smith, S. N "Discrete Frequency Sound Generation in Axial Flow Turbomachines", H,M Stationery office: Richmond UK, 1973; Volume 3709, pp. 1-59.

Data Analysis Procedure

Based on the previous discussion, a dual temporal-spatial analysis method was developed to extract blade vibration-related spinning modes. First, the time domain data for each revolution from each pressure sensor was Fourier transformed to the frequency domain. With the help of the spinning mode table, the frequencies of the blade vibration-related spinning modes are identified. The corresponding frequency component was extracted from each sensor. Next, based on the information of the amplitude and phase of the specific frequency component measured from all sensors, the circumferential analysis incorporated a mode-fitting method to extract the spinning modes for the specific nodal diameters related to blade vibration.

Figure 4:
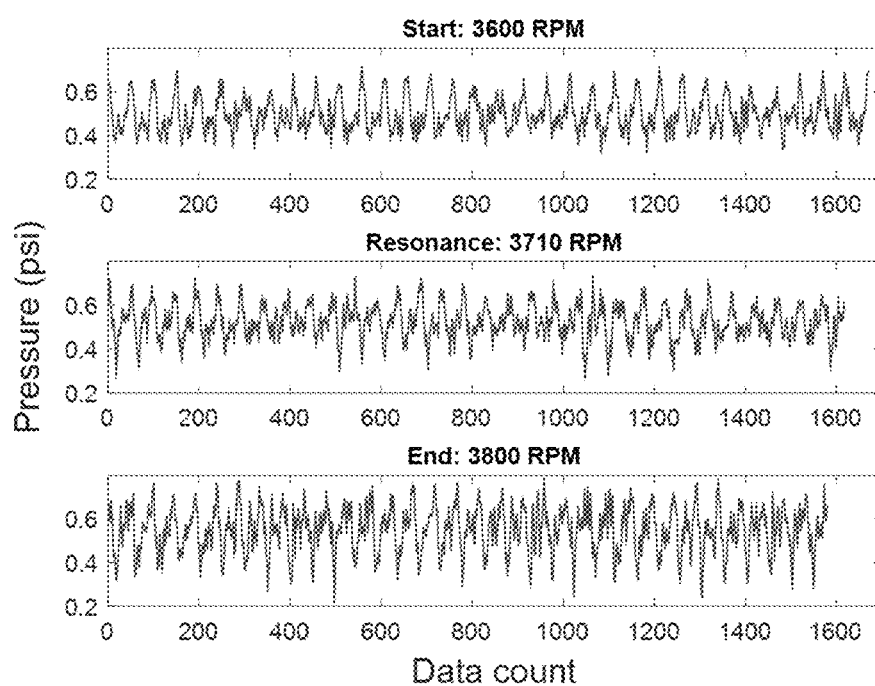
FIG. 4 illustrates one revolution of time domain data at the start, resonance and end of the compressor sweep.
Figure 5:
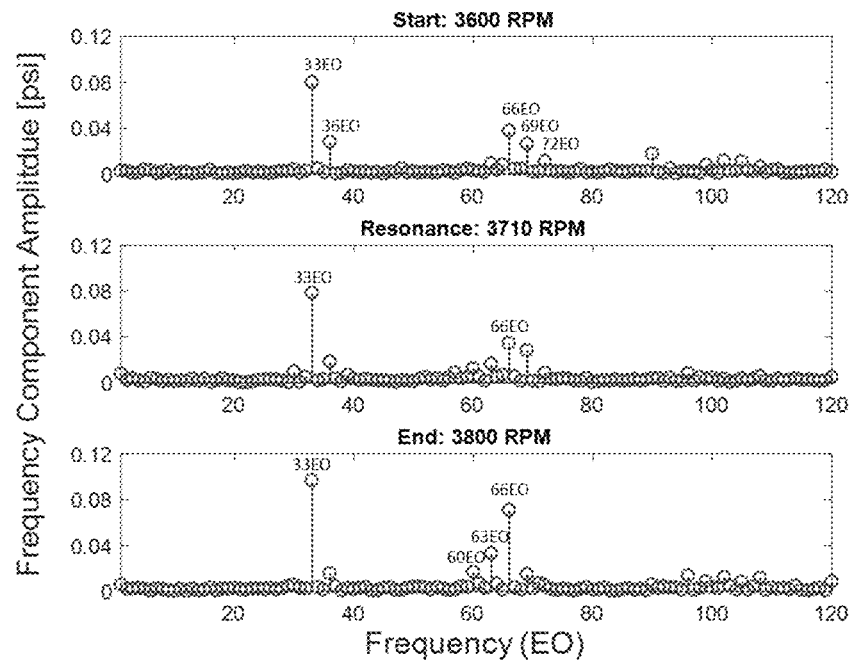
FIG. 5 illustrates one revolution of frequency domain data at the start, resonance and end of the compressor sweep.

One revolution of time domain data from a typical sensor is shown at the start, during resonance, and at the end of the compressor speed sweep in FIG. 4. There are no clear, identifiable features associated with the rotor resonant vibration. The corresponding frequency domain data are shown in FIG. 5. The frequency axis is scaled to Engine Order (EO) to compare data of each revolution despite changing rotational speed and data counts. Again, there are no easily distinguishable spectral features during the rotor resonant vibration.

The peaks in FIG. 5 occur at 33EO, 66EO, 36EO, 69EO, 72EO, 63EO and 60EO. These components, which are measured in the stationary reference frame, can be found in the spinning mode table that considers 6 blade rows (IGV R1 S1R2 S2 R3 or 3 rows upstream and 3 rows downstream of the sensor array) with scatter indices from −2 to 2. If the spinning mode is associated with the R2 forced response vibration, it must have a 44EO frequency in the rotor reference frame since the blade is vibrating at this frequency. Secondly, the vibration due to the S1wakes (and S2 potential field excitation) will have a S1/S2 scatter index of −1. Finally, the Rotor 1 and Rotor3 scatter indices should be zero to avoid the noise from the secondary unsteady waves due to R1 and R3 scattering. Following these criteria, the only components are the 33EO and 66EO components. The 33EO and 66EO are also the top two frequency components in FIG. 5.

Thus, the 33EO and 66EO components were extracted from each casing pressure measurement. Due to the limited number of the sensors and the non-uniform circumferential spacing between them, a circumferential mode fitting approach was developed to separate the spinning modes with different nodal diameters, instead of the traditional spatial FFT method (as used in Sawyer, S. D. and Fleeter, S., "Active control of Discrete-Frequency Turbomachinery Noise Using a Rotary-Valve Actuator" ASME. J. Eng. Gas Turbines Power. 2000, 122(2): 226-232). The general formula to fit n different nodal diameter spinning modes with m sensors at a specific frequency is:

$$\begin{bmatrix} e^{i(ND_1 \cdot \theta_1)} & e^{i(ND_1 \cdot \theta_1)} & \dots & e^{i(ND_n \cdot \theta_1)} \\ e^{i(ND_1 \cdot \theta_2)} & e^{i(ND_2 \cdot \theta_2)} & \dots & e^{i(ND_n \cdot \theta_2)} \\ \vdots & \vdots & \vdots & \vdots \\ \vdots & \vdots & \vdots & \vdots \\ e^{i(ND_1 \cdot \theta_m)} & e^{i(ND_2 \cdot \theta_m)} & \dots & e^{i(ND_n \cdot \theta_m)} \end{bmatrix} \begin{Bmatrix} y_1 \\ y_2 \\ \vdots \\ y_n \end{Bmatrix} = \begin{Bmatrix} x_1 \\ x_2 \\ \vdots \\ x_m \end{Bmatrix} \quad (4)$$

where $y_i$ is the complex strength of the $i^{th}$ spinning mode with NR, $x_j$ is the complex strength of the specified frequency component at the $j^{th}$ sensor. $\theta_j$ is the angular position of the $j^{th}$ sensor in radians.

To solve Eq. (4), m needs to be equal to, or larger than, n. More sensors than the number of modes can be used to achieve a better fit using the least squares method to solve an overdetermined Eq. (4). The RMS fitting error can be quantified as:

$$error = \sqrt{\frac{\sum_{1}^{m} \left( \sum_{1}^{n} e^{i(ND_n \cdot \theta_m)} y_n - x_m \right)^2}{m}} \quad (5)$$

Similar to the NSMS technique, the mode fitting procedure is sensitive to both sensor location and the ND of the modes. Eq. (4) can be rewritten as $[A]\{Y\}=\{X\}$, where $[A]$ is the mode fitting matrix, $\{X\}$ is the input pressure measurements, and $\{Y\}$ is the output mode strength. It can be shown that the condition number of $[A]$ gives upper bound of the ratio between the relative change in output $$\frac{\|\delta Y\|}{\|Y\|}$$

and the relative change in input $$\frac{\|\delta X\|}{\|X\|},$$

that is:

$$\frac{\|\delta Y\|}{\|Y\|} \leq cond(A) \frac{\|\delta X\|}{\|X\|} \quad (6)$$

The smaller the condition number, the less error is introduced in the mode-fitting procedure. In this study, two-norm is used for vector and matrix norm calculation $\| \ \|$. The condition number is calculated as $$cond(A) = \|A\| \|A^+\| \quad (7)$$

where $A^+$ is the Moore-Penrose pseudoinverse of a rectangular matrix A and reduces to the inverse of matrix A if A is a square matrix. The optimum value of cond(A) is one, while a value above two is not recommended. The condition number can be used to optimize sensor circumferential location for the given set of the modal NDs of interest.

Blade Vibration-Related Pressure Wave Extraction

Figure 6:
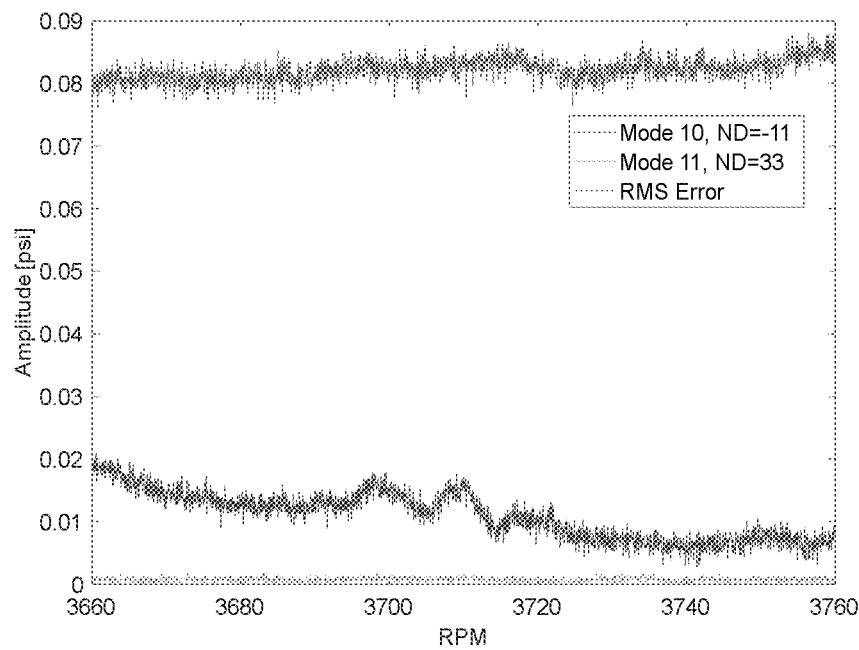
FIG. 6 illustrates circumferential mode fitting result for the 33EO component at HL condition, with 3 Kulite pressure sensors.

As discussed earlier, the 33EO and 66EO components from each revolution were extracted from the frequency domain data of each casing pressure sensors. As shown in Table 1, there are 3 modes (Mode 10, 11 and 12) having a 33EO frequency in the stator reference frame. Since each has a unique ND, the 3 modes can be separated using the circumferential mode-fitting method based on Eq. (4). Mode 10 is due to S1-wake-R2-interaction and R2 blade vibration. Mode 11 is caused by the R2 potential field. Mode 12 is due to R2-potential field-S1-interaction. Since Mode 12 is a cut-off mode with high exponential decay rate (amplitude decreases to 1.5% of the original value across the inter-blade row gap between S1 TE and R2 LE), it was neglected in the circumferential mode fitting procedure To separate the blade vibration related Mode10 (ND=-11) from the rotating R2 potential field related Mode11 (ND=33), the 33EO components from the 3 Kulite pressure sensors were used to fit two modes with ND=-11 and ND=33. Using Eq. (4) and Eq. (5), the amplitude of each mode and the corresponding RMS fitting error during the compressor sweep at the high loading condition are shown in FIG. 6. The ND=33 mode due to R2 potential field is the strongest as expected. The ND=-11 mode shows 3 peaks around the rotor resonant speed range. It will be shown later that these 3 peaks are associated with blade vibration, as measured with NSMS. The low RMS error indicates that the ND=-11 and ND=33 modes are the two dominant modes at the 33EO frequency. The negligible rapidly decaying cut-off mode Mode 12 does not affect the circumferential mode fitting accuracy. Based on the circumferential location of the three Kulite pressure sensors and the ND of the two fitting modes (ND=-11 and ND=33), the condition number for the circumferential mode fitting procedure can be calculated using Eq. (7). The condition number is 1.25, which is a good value that is close to the ideal value of 1.

Figure 7:
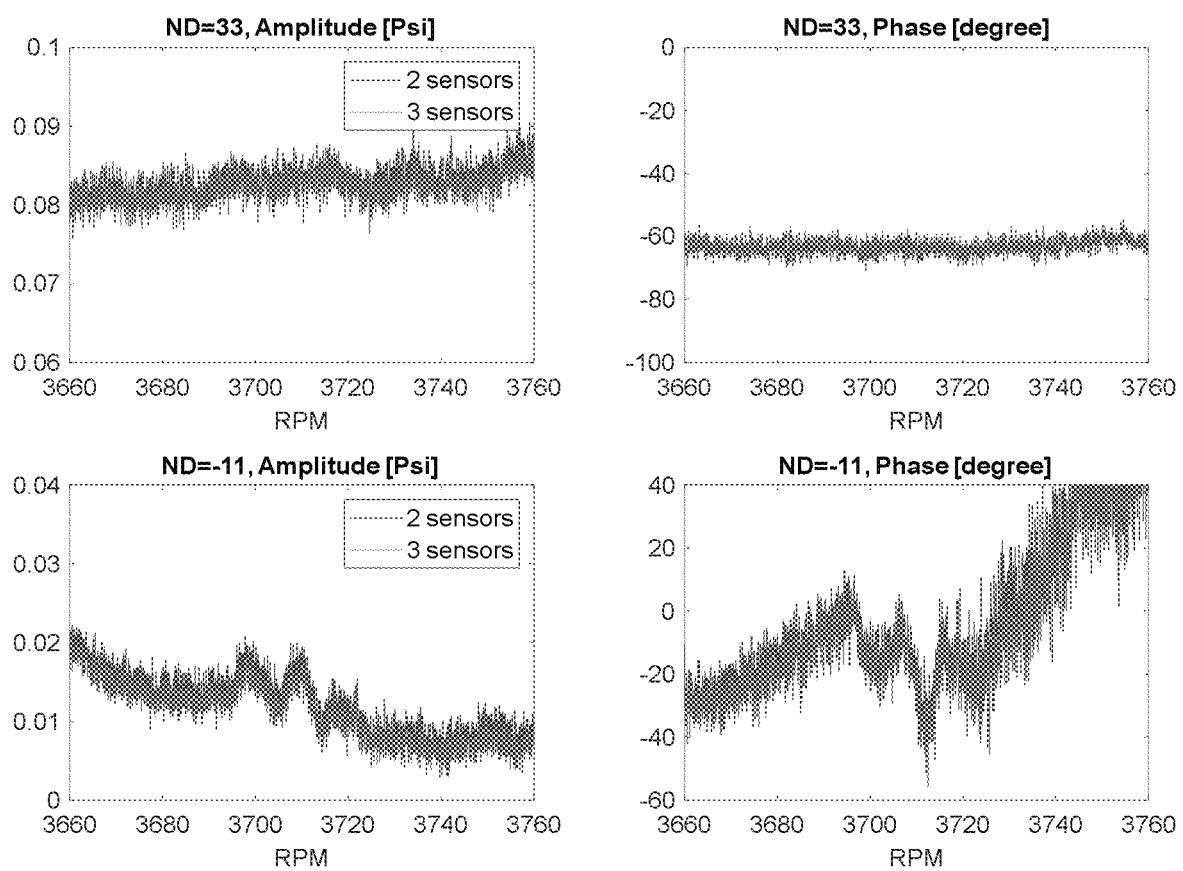
FIG. 7 illustrates circumferential mode fitting result for the amplitude and phase of the ND=33 and ND=−11 mode at HL condition, fitted with 3 Kulite pressure sensors and with 2 Kulite pressure sensors at 150 & 220 degrees.

Since the RMS fitting error is much lower than the amplitude of Mode 10 and Mode 11, data from two Kulite pressure sensors are enough to fit the two dominant modes. Choosing from the three existing sensors, the two sensors at 150 & 220 degrees give the best condition number of 1.19. The results of the circumferential mode fitting for ND=-11 and ND=33 modes using all 3 sensors and then using only the 2 sensors at 150 & 220 degrees are shown in FIG. 7. Representing the effect of R2 potential field, the ND=33 mode amplitude increases slightly with rotational speed. The phase of the ND=33 mode remains roughly constant with speed since the R2 potential filed is locked to the rotor rotation. The ND=-11 mode contains both the pressure wave due to the S1-wake-R2-blade interaction and the wave associated with R2 vibration. In the amplitude graph, the R2 vibration shows up as the 3 distinct peaks (constructive summation) over a smoothly decaying background, which is due to the S1-wake-R2-blade interaction. In the phase graph, prior to resonance at speeds less than 3690 rpm, the ND=-11 mode is dominated by the pressure wave due to the S1-wake-R2-blade interaction, and the phase increases in a linear manner. During the resonant vibration, from 3690 to 3730 rpm, the summation of the pressure waves from both effects results in a rapid change in phase. When speeds are larger than 3730 rpm, the ND=-11 mode is dominated by the pressure wave due to the S1-wake-R2-blade interaction again, and the phase continues to increase linearly.

Additionally, FIG. 7 shows that both the amplitude and phase of the two modes fitted using 3 sensors and 2 sensors agree with each other well. This suggests that the blade vibration-related mode can be separated from the strong rotor potential field mode effectively with only two Kulite pressure sensors in this case study.

Figure 8:
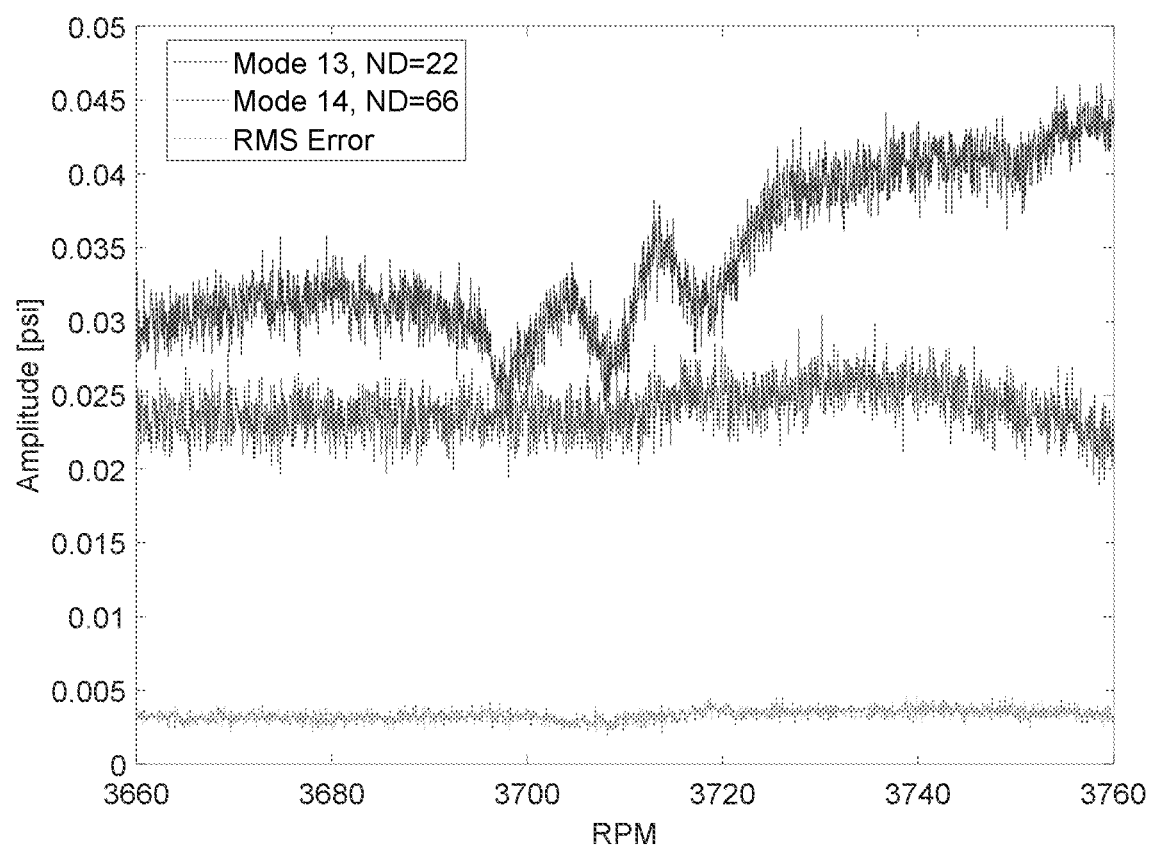
FIG. 8 illustrates circumferential mode fitting result for the 66EO component at HL condition, with 3 Kulite pressure sensors.

A similar analysis was performed for the 66EO component. As shown in Table 1, Modes 13, 14, 15 have 66EO frequency in the stator reference frame. Mode 13 is the 2nd scattered mode due to the S1-wake-R2-intercation and the R2 vibration. Mode 14 has 0 frequency in the rotor reference frame and 66EO frequency (i.e. 2BPF) in the stator reference frame. It corresponds to the $2^{nd}$ harmonic of the R2 potential field. Mode 15 is a cut-off mode with a very high exponential decay rate (amplitude decreases to 0.2% of the original value across the inter blade row gap between S1 TE and R2 LE). Thus, it was neglected in the circumferential mode-fitting procedure. Using the 66EO components of the three sensors to fit Mode 13 (ND=22) and Mode 14 (ND=66), their amplitudes and corresponding RMS fitting error are shown in FIG. 8. The low RMS fitting error suggests that Mode 13 and Mode 14 are the two dominant modes, and the circumferential mode fitting was successful.

Figure 9:
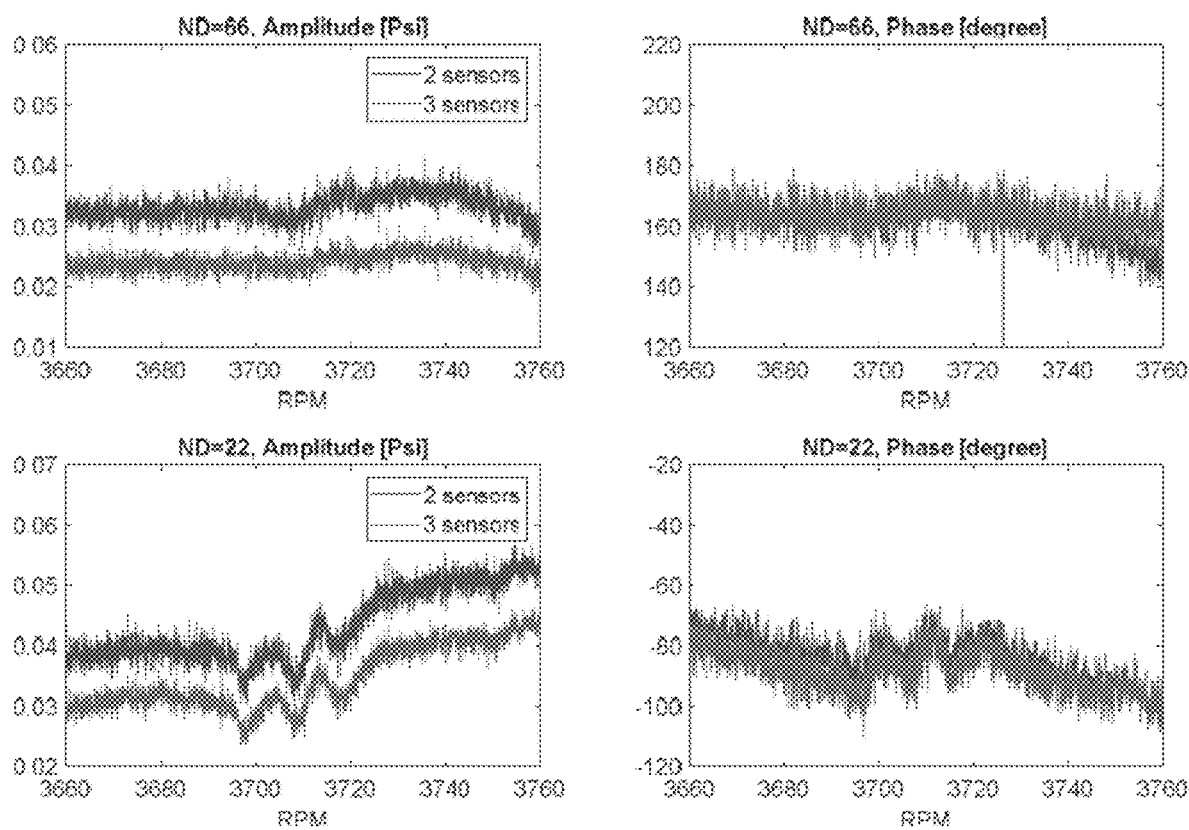
FIG. 9 illustrates circumferential mode fitting result for the amplitude and phase of the ND=66 and ND=22 mode at HL condition, fitted with 3 Kulite pressure sensors and with 2 Kulite pressure sensors at 150 & 220 degrees.

Since Mode 13 (ND=22) and Mode 14 (ND=66) dominate the 66EO component, data from the two sensors at 150 & 220 degrees were also used to fit the ND=22 and ND=66 mode. The amplitude and phase of each mode are shown in FIG. 9. For both modes, the amplitude fitting that utilized 2 sensors and the amplitude fitting that utilized 3 sensors have the same shape; they only differ by a constant offset. The corresponding phases match, as well. The offset in amplitude may be caused by the noise from other minor spinning modes or the turbulence-based broadband noise presented in the 66EO frequency component. With 3 sensors, the noise is lumped into the RMS error term during the circumferential mode fitting process. This results in the lower amplitudes of both modes fitted when using 3 sensors than when using 2 sensors. Since a constant offset in amplitude can be easily removed in a post-processing procedure, 2 pressure sensors are adequate to separate the blade vibration-related Mode 13 (ND=22) from the Rotor 2 potential field-related Mode 14 (ND=66).

As show in FIG. 9, the amplitude of the ND=66 mode (associated with the $2^{nd}$ harmonic of the R2 potential field) increases slightly with speed, but its phase is nearly constant. Similar to the ND=-11 mode in FIG. 7, the ND=22 mode contains both the unsteady pressure wave due to the S1-wake-R2-blade interaction and the R2 vibration. Outside of the resonant speed range (3690 to 3730 rpm), where the blade is not vibrating, the unsteady pressure wave due to the S1-wake-R2-interaction dominates. The ND=22 mode amplitude increases with speed, and the phase decreases with speed gradually. During the R2 vibration, the unsteady pressure wave due to R2 blade vibration is superimposed onto the unsteady pressure waves due to S1-wake-R2-interation, resulting in the three local minima (destructive summation) in the amplitude. The phase of the ND=22 mode also shows rapid change in phase during the blade resonant vibration.

Comparison with NSMS Results

Figure 10:
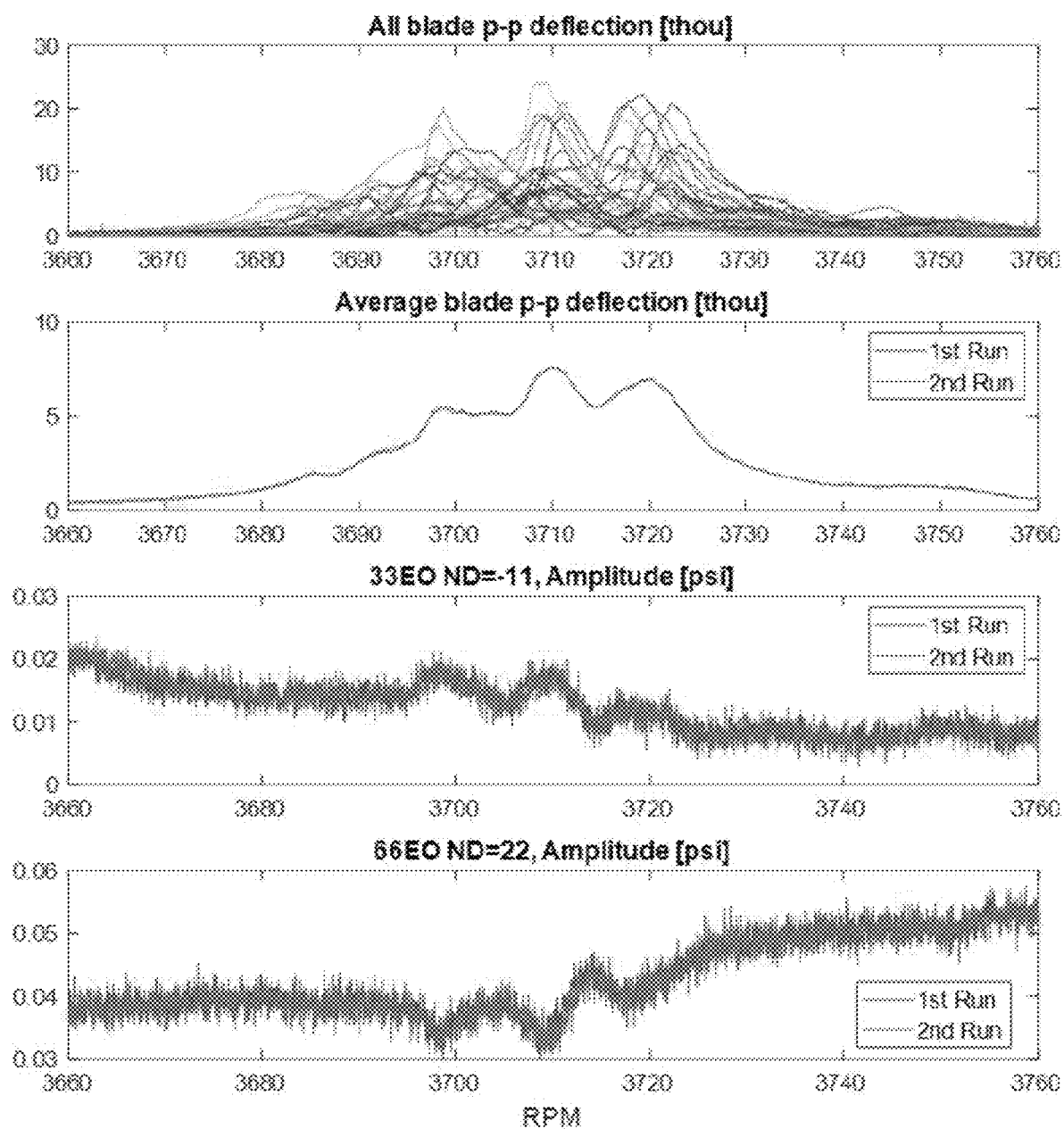
FIG. 10 illustrates comparison of NSMS results and casing pressure sensors array results at HL condition, with the 2 Kulite pressure sensors.

The 33EO ND=-11 mode amplitude exhibits three local maxima, and the 66EO ND=22 mode amplitude shows three local minima during the rotor vibratory response. The amplitudes of the two modes fitted using the 2 pressure sensors are compared with NSMS blade tip deflection results in FIG. 10. Because of mistuning, the resonant peak of each blade occurs at a different speed. The spinning mode analysis done in this study assumes a tuned blade row. The pressure waves due to blade vibration are considered to be the result of a tuned rotor vibrating at ND=-11. The NSMS results do show that ND=-11 is the dominant nodal diameter for the rotor vibratory response. Thus, the average tip deflection of all 33 rotor blades at each revolution is used to compare with the amplitudes of the modes for the rotor blade vibration-related modes determined from the casing pressure sensor array. FIG. 10 shows the following points.

Firstly, the three peaks of the 33EO ND=-11 mode and the three valleys of the 66EO ND=22 mode line up well with the three peaks in the average blade tip p-p deflection from the NSMS results. The rotor speed differences between the peaks in the NSMS results and the pressure sensor array results are less than 2 rpm, which is about the same level of the uncertainty in the rotor speed calculation using the 1/rev signal.

Secondly, unlike the NSMS results, the amplitudes of both the R2 vibration-related modes are non-zero when the blades are not vibrating. As discuss earlier, the unsteady pressure waves in each mode are generated by both the S1 wake-R2 blade interaction and the R2 blade vibration. The pressure waves from the two interactions have the same nodal diameter and frequency since the forced response R2 vibration is driven by the unsteady loading caused by the S1 wake-R2 blade interaction. The casing pressure array cannot distinguish them, and thus, the measurement accounts for the total effect of these two different types of pressure waves. The S1 wake-R2 interaction is always present, but the R2 blades are not always vibrating. Thus, it is likely responsible for the slowly changing background. The constructive addition of the two types of pressure waves is believed to be the reason for the peaks in the 33EO ND=-11 mode, and the destructive addition is believed to result in the valleys shown in the 66EO ND=22 mode. The issue is further complicated by the additional pressure waves associated with the R1 & R3 reflection and scattering, and the pressure wave generated by the S2 potential field and R2 interaction, although these are expected to be small.

Figure 11:
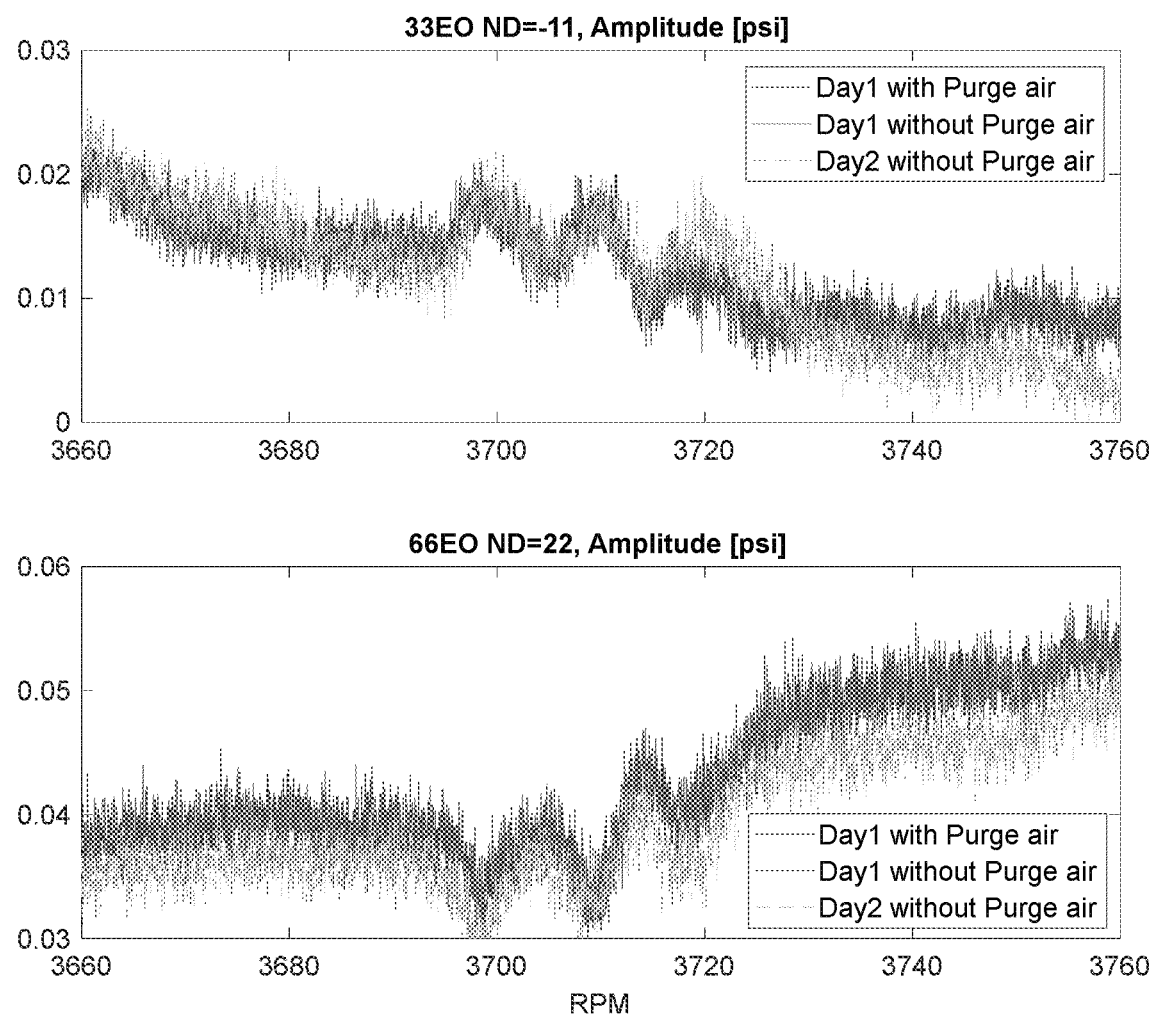
FIG. 11 illustrates comparison the blade vibration related pressure waves strength taken from 3 different measurements at HL condition, with the 2 Kulite sensors.

Finally, the repeatability of the two runs is good for both the NSMS results and the casing unsteady pressure results, as shown in FIG. 10. The R2 1T resonant vibration and the corresponding pressure waves are clearly identified and captured. When acquiring NSMS data, purge air at 100 psi greater than the stage pressure is required to flow through the holes around the NSMS light probes to keep the probes clean. Since the NSMS data and Kulite pressure sensor array data were acquired simultaneously for validation purpose, it would be possible that the purge air could contaminate the blade vibration-related pressure waves since the NSMS probes are near the Kulite array, as shown in FIG. 1. FIG. 11 compares the extracted blade vibration-related pressure waves calculated for cases with and without NSMS purge air present, as well as day-to-day variations by considering data acquired a month later. On the same day, the close match in the data acquired with and without NSMS purge air shows that the noise from purge air is negligible in the dual temporal-spatial analysis method. The repeatability of the pressure waves strength on two different days is also good, despite a small shift at the end of sweep. Considering the noisy environment inside the multistage compressor, the dual temporal-spatial analysis method derived in this study does a good job filtering out noise allowing the determination of the mode related to the rotor blade vibration.

Additional Post-Processing Procedure

So far the discussion has been focused on the raw data to preserve all the information of blade vibration-related pressure waves. However, low-pass filtering and zeroing are commonly used in the NSMS post-processing procedure to obtain more accurate blade deflection information. Low-pass filters remove high-frequency noise not related to blade vibration. Zeroing is used to remove the blade static deflection, which slowly varies with rotational speed.

Figure 12:
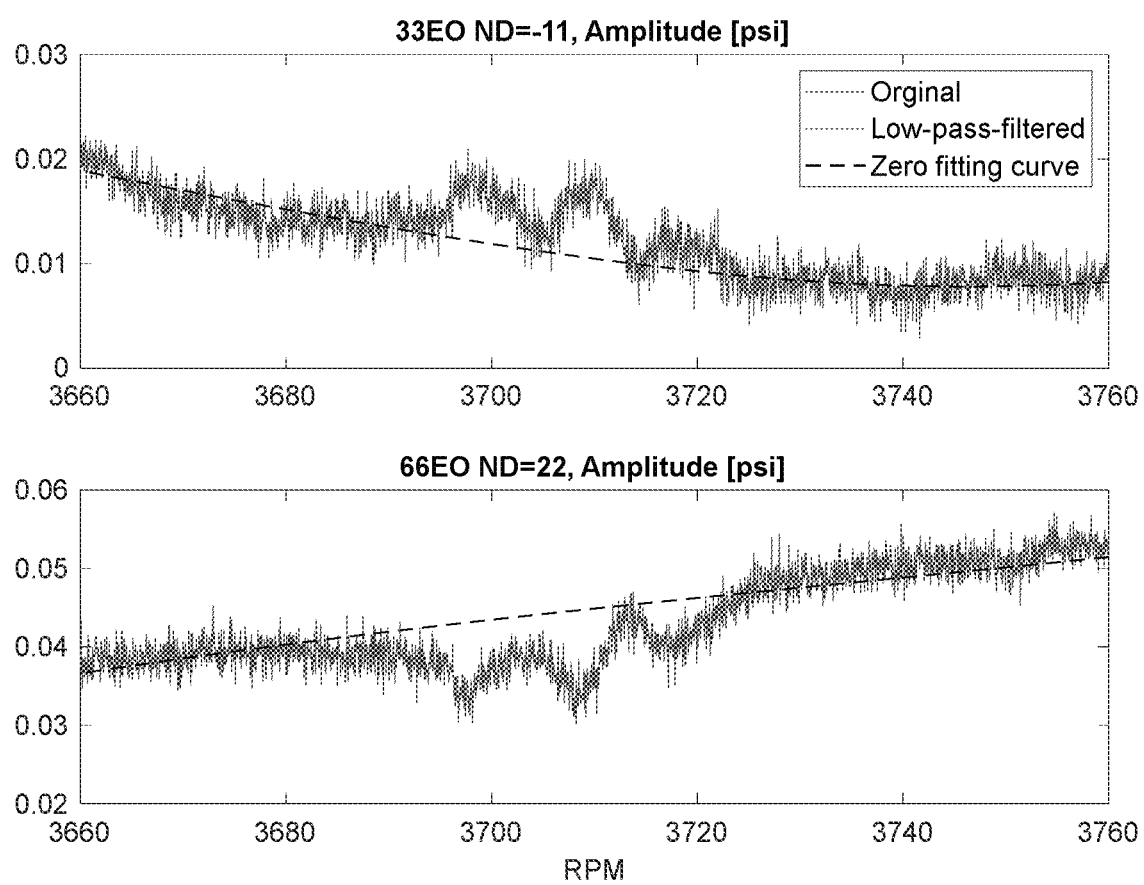
FIG. 12 illustrates the low pass filtering and zeroing of the blade vibration related pressure waves at HL condition.

Similarly, a low-pass filter with a moving ensemble average of 10 revolutions was used to remove the high-frequency noise in the pressure waves. When the compressor is sweeping through the R2 1T resonant speed at 3 rpm/s, 10 revolutions correspond to a time frame where the compressor speed changes less than 0.5 rpm and is small enough to conduct an ensemble average. In addition, zeroing was performed by a complex second-order polynomial fit to the slowly changing background pressure wave due to the S1-wake-R2-blade interaction. The polynomial fit was done by fitting 8 points outside the resonant speed range from 3690 to 3730 rpm. FIG. 12 shows the original pressure wave amplitudes, the low-pass filtered result, and the result when applying the complex polynomial curve fit for zeroing at the high loading condition.

Figure 13:
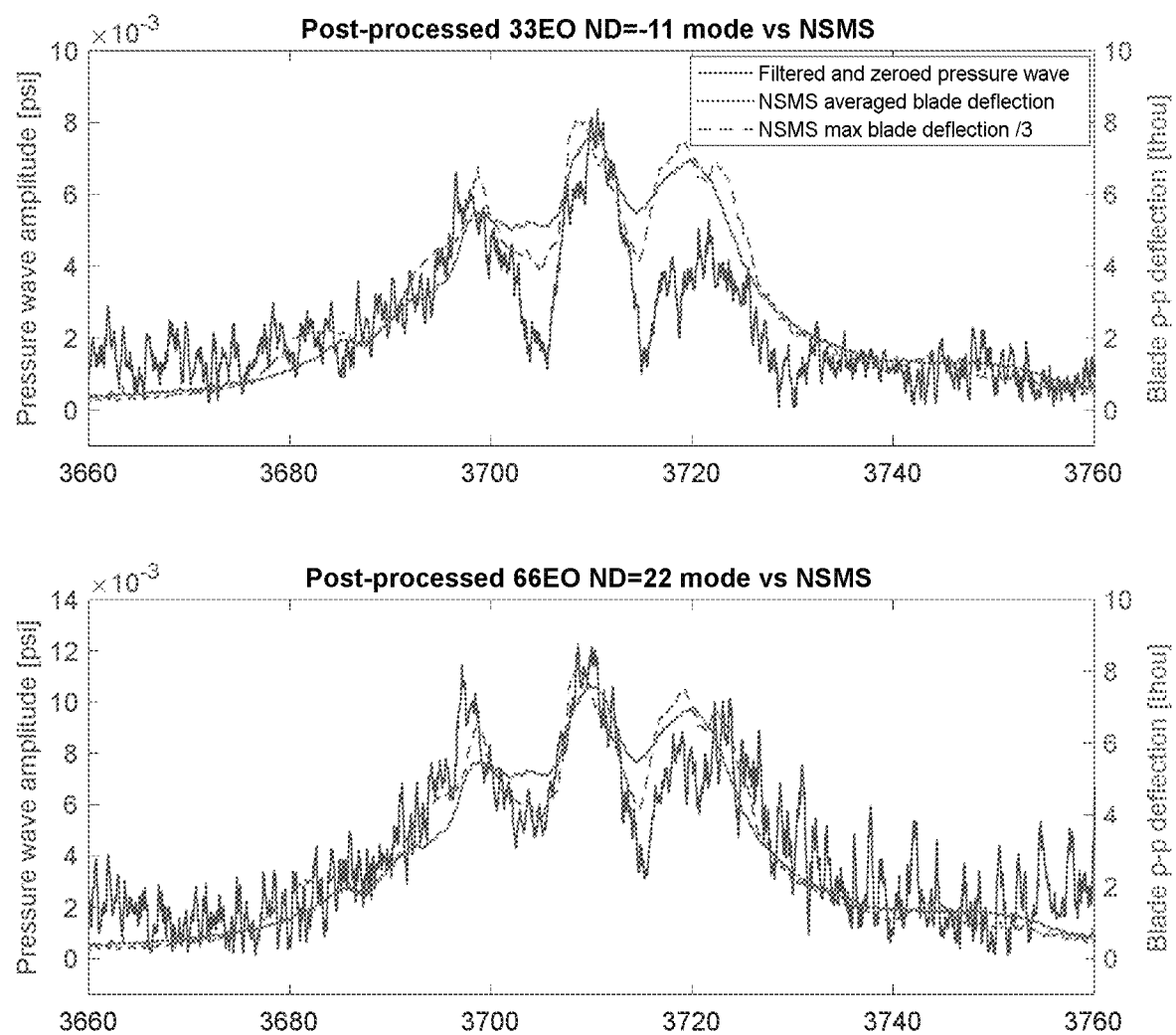
FIG. 13 illustrates comparison of the filtered & zeroed blade vibration generated pressure waves amplitude and the average & max blade deflection NSMS results at HL condition.

Based on the linearized assumption, the extracted pressure waves of the 33EO ND=−11 mode and the 66EO ND=22 mode are the summation of the pressure waves due to the S1-wake-R2-interaction and the pressure wave due to R2 vibration. The zero-fitting curve corresponds to the slowly changing background pressure waves due to the S1-wake-R2-interaction. Thus, the pressure wave due to blade vibration can be obtained by subtracting the zero fitting curve from the total pressure wave extracted from the casing pressure sensor array. The resultant pressure wave amplitudes, after proper low-pass filtering and zeroing, are compared with the average and maximum NSMS blade tip deflection results in FIG. 13. There is a reasonably good match of the response curve between the two measurement techniques, especially the overall shape and locations of the local minima/maxima. Besides the fitting error and noise, one major reason for the differences is due to the tuned rotor assumption in the spinning mode theory. It is assumed that the pressure waves are generated by the vibration of a tuned blade row. While in reality, the blade vibration peaks occur at different rotational speeds due to mistuning. Although the average blade deflection is a good approximation of the general behavior of a tuned blade row, there may be a blade deflection threshold below which the blade vibration cannot generate pressure waves that are strong enough to be detected by the casing pressure sensors. This changes the overall pressure wave response pattern when compared with the average blade deflection curve. The better match between the blade vibration-generated pressure wave amplitude with the NSMS maximum blade deflection than the match with the NSMS average blade defection supports the existence of the blade deflection threshold needed for pressure wave generation.

Figure 14:
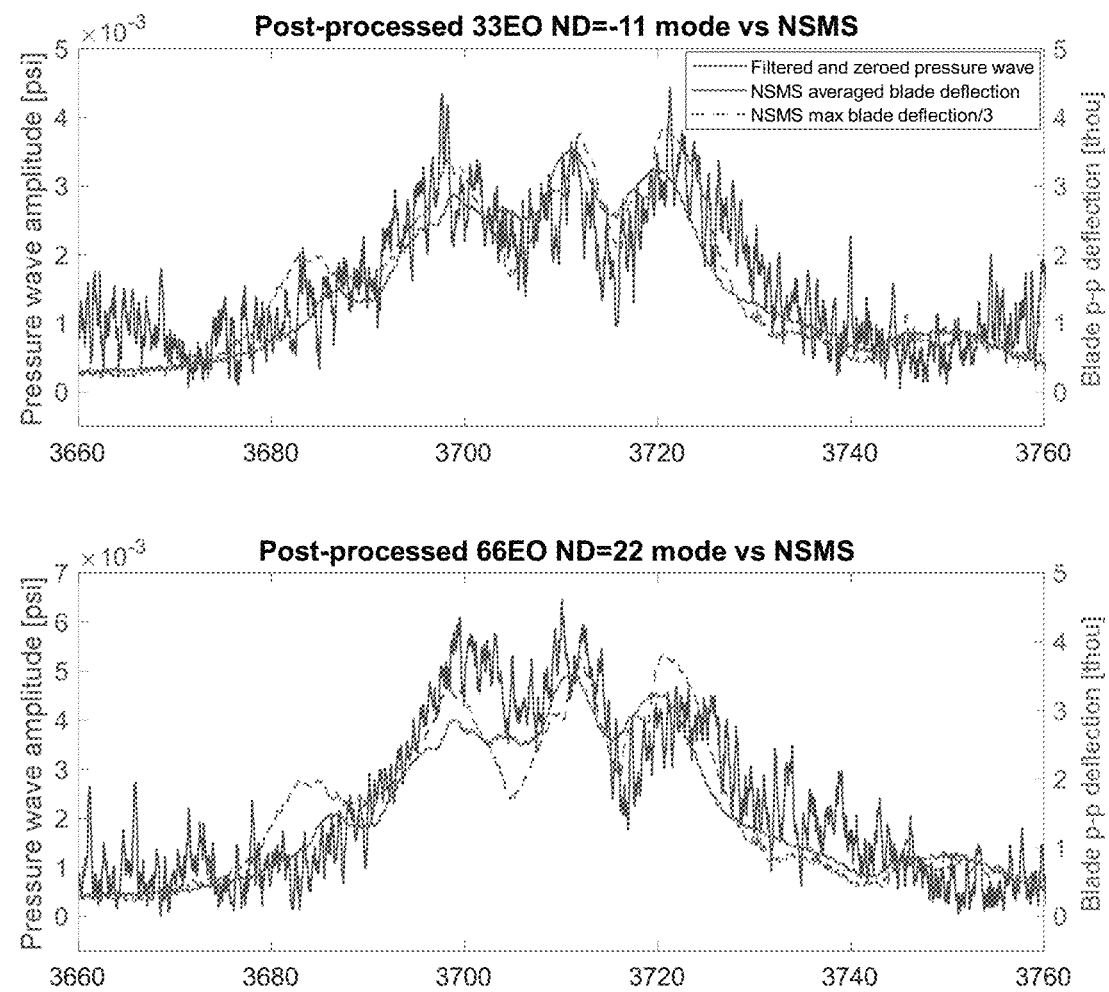
FIG. 14 illustrates comparison of the filtered & zeroed blade vibration generated pressure waves amplitude and the average & max blade deflection NSMS results at NL condition.

The casing unsteady pressure data collected from the 2 sensors at the nominal loading condition were processed in the same way. The resultant pressure wave amplitudes are compared with the corresponding NSMS results in FIG. 14. Although the blade vibration-generated pressure wave strengths are noisier than those at high loading, the overall shape and location of the peaks/valleys still match well with the NSMS results. Comparing FIG. 14 with FIG. 13, the blade deflection at the nominal loading condition is about half that at the high loading condition, and the corresponding blade vibration-generated pressure waves also reduce to half of the strength at the high loading condition. This suggests a constant scaling factor between the blade deflection amplitude and the vibration-generated pressure wave amplitude. Based on the results from both loading conditions, the scaling factor is approximately 1e-3 psi per one-thousandth of inch average blade deflection for the $1^{st}$ scattered pressure wave (the 33EO ND=−11 mode), and approximately 1.4e-3 psi per one-thousandth of inch average blade deflection for the $2^{nd}$ scattered pressure wave (the 66EO ND=22 mode). The nominal loading results in FIG. 14 also show that for an average blade deflection as small as 0.004 in., its vibration-generated pressure waves can still be extracted from the noisy flow field inside the multistage compressor using only 2 sensors in this case study.

Considering the 25% of difference between the NSMS and strain gauge results in the XTL17 technology demonstrator experiment in 2002 (See Russhard, P., "The Rise and Fall of the Rotor Blade Strain Gauge," Vibration Engineering and Technology of Machinery, Springer International Publishing, Cham, Switzerland, 2015, p. 27), the current difference between NSMS and pressure wave results is acceptable. This appears to be the first time that blade vibration-related pressure waves were extracted from casing pressure sensor arrays and used to quantify blade vibration. Future improvements on sensor array configuration, calibration procedures, and post-processing procedures have the potential to greatly improve the accuracy of the newly developed unsteady pressure wave-based non-intrusive blade vibration monitoring technique.

Linearized Analysis

As discussed in the physical process section, the pressure waves due to R2 forced vibration and due to the S1-wake-R2-interaction have the same frequency and ND. The dual temporal-spatial analysis method cannot distinguish between them. Thus, the pressure waves extracted from the casing pressure sensor array are the summation of the two effects. However, since the blade deflection amplitude is very small even at resonant condition, the pressure wave generated by the two mechanisms can be treated separately. This linearized analysis assumption is the basis for using the polynomial fit outside the resonant range to approximate the slowly changing pressure wave due to the S1-wake-R2-interaction. Then, it can be subtracted from the total pressure wave extracted from the casing pressure sensor array to obtain the pressure wave only due to the R2 vibration.

Although the post-processed pressure wave results based on the linearized analysis assumption match well with the NSMS results, a semi-analytical analysis using the flat plate cascade unsteady aerodynamic code LINSUB (See Whitehead, D. S., "Unsteady two-dimensional linearized subsonic flow in cascades", AGARD Manual on Aeroelasticity in Axial-Flow Turbomachines, 1987, vol. 1, p. 3.24-3.30) in was conducted to further support this linearized analysis assumption by showing that the three peaks in the 33EO ND=−11 mode and three valleys in the 66EO ND=22 mode in FIG. 10 are caused by constructive and destructive combinations of the pressure waves due to the S1-wake-R2-blade interaction and the R2 vibration, respectively. The original LINSUB code was extended to calculate the scattered pressure waves (See Leng, Y, "Preliminary Design Tools in Turbomachinery: Non-uniformly Spaced Blade Rows, Multistage Interaction, Unsteady Radial Waves, and Propeller Horizontal-Axis Turbine Optimization", 2016, PhD thesis, Purdue University, USA), since both the 33EO ND=−11 mode and the 66EO ND=22 mode are scattered modes at R2. The LINSUB inputs are based on a steady CFD analysis for the mean flow conditions in the R2 domain, and the nodal diameters and frequencies are taken from the spinning mode table, Table 1.

Although the multistage interaction can be complicated by involving R1 and R3 reflections, the focus is the unsteady pressure waves measured at the casing pressure sensor array, which are between the S1 trailing edge and the R2 leading edge. In this region, the major pressure waves are the upstream-going pressure waves generated by the S1-wake-R2-blade interaction and the upstream-going pressure wave due to R2 vibration, as illustrated in FIG. 3.

When the S1 wake impinges on the R2 blade, the primary upstream-going pressure wave due to the S1 wake, $P_{up0\_wake}$, has zero frequency in the stator reference frame and cannot be measured by the pressure transducer array. The scattered pressure waves, $P_{up1\_wake}$ and $P_{up2\_wake}$, contribute to the 33EO ND=−11 mode and 66EO ND=22 mode, respectively. Their strength at the casing pressure sensor array can be calculated as:

$$P_{up1\_wake} = C_{pup1\_wake} \zeta \exp(ik_{x1}\Delta x) \quad (8)$$

$$P_{up2\_wake} = C_{pup2\_wake} \zeta \exp(ik_{x2}\Delta x) \quad (9)$$

wherein $C_{pup1\_wake}$ and $C_{pup2\_wake}$ are the unsteady aerodynamic influence coefficients for the $1^{st}$ and $2^{nd}$-order scattered upstream-going pressure waves due to the wake. The coefficients $k_{x1}$ and $k_{x2}$ are the corresponding axial wave numbers, and $\zeta$ is the wake strength. The axial distance between R2 and the sensors is $\Delta x$.

The S1 wake also causes unsteady loading on R2. By assuming an uncoupled SDOF torsional vibration, the rotor blade vibration amplitude due to the S1 wake can be calculated using:

$$\alpha = -\frac{B_G \zeta}{I_\alpha \omega^2 - I_\alpha \omega_\alpha^2 - i\omega C_\alpha + B_\alpha} \quad (10)$$

In equation (10), $I_\alpha$ is the mass moment of inertia for the 1T mode, $C_\alpha$ is the structural damping, and $\omega$ and $\omega_\alpha$ are the excitation frequency and R2 blade 1T mode natural frequency, respectively. Coefficients $B_\alpha$ and $B_G$ are the unsteady aerodynamic influence coefficients for the unsteady moment due to torsional vibration of the blade and due to the wake, respectively. During resonance, $\omega$ is equal to $\omega_\alpha$. Assuming zero structural damping (reasonable for a blisk), the blade resonant amplitude can be approximated as:

$$\alpha = -B_G \zeta / B_\alpha \quad (11)$$

As discussed earlier, the pressure waves due to blade vibration have the same frequency and nodal diameter as pressure waves associated with S1wake-R2 interactions. The scattered pressure wave strength due to blade torsional vibration $P_{up1\_\alpha}$ (belonging to the 33EO ND=−11 mode) and $P_{up2\_\alpha}$ (belonging to the 66EO ND=22 mode) at the sensor location can be calculated as:

$$P_{up1\_\alpha} = C_{pup1\_\alpha} \alpha \exp(ik_{x1}\Delta x) \quad (12)$$

$$P_{up2\_\alpha} = C_{pup2\_\alpha} \alpha \exp(ik_{x2}\Delta x) \quad (13)$$

wherein $C_{pup1\_\alpha}$ and $C_{pup2\_\alpha}$ are the unsteady aerodynamic influence coefficients for the $1^{st}$ and $2^{nd}$-order scattered upstream-going pressure waves due to blade torsional vibration Combining Eqs. (8), (11), (12) and Eqs. (9), (11), (13), the phase difference between pressure waves due to R2 blade torsional vibration and S1-wake-R2-interaction in the 33EO ND=−11 mode and in the 66EO ND=22 mode can be calculated using Eq. (14) and (15), respectively:

$$\angle \frac{P_{up1\_\alpha}}{P_{up1\_wake}} = \angle \frac{-C_{pup1\_\alpha} B_G}{C_{pup1\_wake} B_\alpha} \quad (14)$$

$$\angle \frac{P_{up2\_\alpha}}{P_{up2\_wake}} = \angle \frac{-C_{pup2\_\alpha} B_G}{C_{pup2\_wake} B_\alpha} \quad (15)$$

Using the modified LINSUB code to calculate the unsteady aerodynamic influence coefficients in both equations, for the $1^{st}$-order scattered mode 33EO ND=−11, the phase difference between the two types of pressure waves is 103.7°, representing a partially constructive addition. For the $2^{nd}$-order scattered mode 66EO ND=22, the phase difference is 181.6°, representing a mostly destructive addition.

This disclosure presents a novel, non-intrusive blade vibration monitoring technique using an array of unsteady pressure sensors flush-mounted in the casing of a multistage axial compressor. Based on spinning mode theory, the pressure waves related to blade vibration are identified according to both their frequency and nodal diameter. A dual temporal-spatial analysis method (a Fourier Transform in the time domain and mode fitting in the circumference spatial domain) was developed to extract the blade vibration-related pressure waves from the noise due to rotor potential field and other noise inside a multistage compressor. Based on a linearized analysis assumption, the pressure wave due to Rotor 2 forced vibration is separated from the wave associated with the S1-wake-R2-interaction. The resultant pressure wave amplitude matches the NSMS blade deflection data well. A constant scaling factor between the amplitude of the pressure wave due to blade vibration and the average blade deflection amplitude measured by NSMS characterized the change between the two different loading conditions.

During the development of the non-intrusive blade vibration monitoring technique, two important points are observed:

1. The primary pressure wave generated by the forced response vibration of R2 has zero frequency in the stationary reference frame. Only R2 scattered pressure waves can be measured to track blade vibration. However, these scattered pressure waves have the same blade passing frequency as the R2 potential field in the stationary reference frame. The R2 potential fields, thus, cause significant noise in the casing unsteady pressure data, but they can be separated because their nodal diameters are different from the blade vibration-related R2 scattered pressure waves.

2. The forced response vibration of R2 is mainly driven by the unsteady loading due to the S1-wake-R2-blade interaction. Thus, the pressure waves caused by the R2 vibration and S1-wake-R2-blade interactions have the same frequency and nodal diameter. However, the pressure waves due to the S1-wake-R2-blade interactions change slowly with compressor speed, compared to that due to the R2 blade vibration, which occurs only near the resonant speeds. This feature can be used to separate the pressure waves generated by the two different mechanisms.

Nomenclature

1T: 1st torsion mode; BTT: Blade tip timing; BPF: Blade passing frequency; EO: Engine order; HL: High loading; IGV: Inlet guide vane; LE: Leading edge; ND: Nodal diameter; NL: Nominal loading; NSMS: Nonintrusive stress measurement system; R2: Rotor 2; RMS: Root mean square; rpm: Round per minute; S1: Stator 1; S2: Stator 2; SDOF: Single degree of freedom; TE: Trailing edge; thou: thousandth of an inch; $\alpha$: Torsional vibration angle; $\theta$: Angular position of the pressure sensor; ζ: Sator1 wake strength; ω: Excitation frequency; $\omega_\alpha$: Rotor2 blade 1T mode natural frequency; Ω: Rotational speed; $n_i$: Integer scattering index of $i^{th}$ row; $k_x$: Axial wave number; $k_y$: Tangential wave number; $B_i$: Blade count of $i^{th}$ row; $C_\alpha$: Structural damping; $P_{up}$: Upstream going unsteady pressure; $\bar{p}$: Pressure wave amplitude; $I_\alpha$: Mass moment of inertia; $B_\alpha$: Moment due to torsional vibration; $B_G$: Moment due to wake; $C_{pup\_wake}$: Upstream going pressure wave due to wake; $C_{pup\_\alpha}$: Upstream going pressure wave due to torsional vibration; Subscript "$_0$": Primary wave; Subscript "$_1$": $1^{st}$ scattered wave; Subscript "$_2$": $2^{nd}$ scattered wave.

Those skilled in the art will recognize that numerous modifications can be made to the specific implementations described above. The implementations should not be limited to the particular limitations described. Other implementations may be possible.

We claim:

1. A method to detect compressor rotor blade vibration, comprising:
   mounting at least two pressure sensors at circumferential locations in a casing, the at least two pressure sensors for detecting pressure waves;
   measuring, with the at least two pressure sensors, unsteady pressure waves generated during rotor blade vibration;
   representing the generated unsteady pressure waves by spinning pressure waves using spinning mode theory;
   extracting, with temporal-spatial analysis, frequency and nodal diameter information of the spinning pressure waves; and
   identifying compressor rotor blade vibration according to at least the extracted frequency and nodal diameter information.

2. The method of claim 1, further comprising using an analytical method to estimate axial decay rates of each of said pressure waves that are associated with blade vibration.

3. The method of claim 2, further comprising a step to determine whether a pressure wave is cut-on or cut-off, wherein only cut-on or substantially near cut-on pressure waves with low decay rates are analyzed.

4. The method of claim 1, wherein the number of the at least two pressure sensors is equal to or more than the number of spinning modes of interest.

5. The method of claim 4, wherein the circumferential location mounting of the at least two pressure sensors is optimized by a calculation minimizing the condition number of fitting matrix A, wherein the fitting matrix A and the condition number of said fitting matrix are defined by:

$$\mathrm{cond}(A) = \|A\| \|A^+\|$$

wherein $A^+$ is the Moore-Penrose pseudoinverse of A, $\|\cdot\|$ is the two norm of the matrix A, and $$A = \begin{bmatrix} e^{i(ND_1 \cdot \theta_1)} & e^{i(ND_2 \cdot \theta_1)} & \cdots & e^{i(ND_n \cdot \theta_1)} \\ e^{i(ND_1 \cdot \theta_2)} & e^{i(ND_2 \cdot \theta_2)} & \cdots & e^{i(ND_n \cdot \theta_2)} \\ \vdots & \vdots & \vdots & \vdots \\ \vdots & \vdots & \vdots & \vdots \\ e^{i(ND_1 \cdot \theta_m)} & e^{i(ND_2 \cdot \theta_m)} & \cdots & e^{i(ND_n \cdot \theta_m)} \end{bmatrix}.$$

6. The method of claim 5, wherein unsteady pressure signals are simultaneously sampled from each of the at least two pressure sensors.

7. The method of claim 6, further comprising extracting each pressure wave strength from the pressure sensor data with the temporal-spatial analysis.

8. The method of claim 7, wherein the temporal-spatial analysis further comprises extracting specific frequency components using Fourier Transform method, and then extracting specific nodal diameter components from the frequency components with a circumferential mode-fitting algorithm.

9. The method of claim 8, wherein the circumferential mode-fitting algorithm is formulated with:

$$\begin{bmatrix} e^{i(ND_1 \cdot \theta_1)} & e^{i(ND_2 \cdot \theta_1)} & \cdots & e^{i(ND_n \cdot \theta_1)} \\ e^{i(ND_1 \cdot \theta_2)} & e^{i(ND_2 \cdot \theta_2)} & \cdots & e^{i(ND_n \cdot \theta_2)} \\ \vdots & \vdots & \vdots & \vdots \\ \vdots & \vdots & \vdots & \vdots \\ e^{i(ND_1 \cdot \theta_m)} & e^{i(ND_2 \cdot \theta_m)} & \cdots & e^{i(ND_n \cdot \theta_m)} \end{bmatrix} \begin{Bmatrix} y_1 \\ y_2 \\ \vdots \\ y_n \end{Bmatrix} = \begin{Bmatrix} x_1 \\ x_2 \\ \vdots \\ x_m \end{Bmatrix}$$

wherein $y_i$, the complex strength of the $i^{th}$ spinning mode with $ND_i$, $x_j$ is the complex strength of the specified frequency component at the $j^{th}$ sensor and $\theta_j$, is the angular position of the $j^{th}$ sensor in radians.

10. The method of claim 9, wherein the temporal-spatial analysis further comprises isolating pressure waves associated with blade vibration from noise.

11. The method of claim 10, wherein the isolation of the pressure waves associated with blade vibration is achieved with a polynomial fitting method to zero the slowly changing background due to the wake/potential field-rotor interaction.

* * * * *